United States Patent
Shen

(10) Patent No.: US 10,158,920 B2
(45) Date of Patent: Dec. 18, 2018

(54) INTERACTION SYSTEM AND INTERACTION METHOD THEREOF

(71) Applicants: Jong Park, Cary, NC (US); KuoYeh Shen, Taipei (TW)

(72) Inventor: KuoYeh Shen, Taipei (TW)

( * ) Notice: Subject to any disclaimer, the term of this patent is extended or adjusted under 35 U.S.C. 154(b) by 0 days.

(21) Appl. No.: 15/544,884

(22) PCT Filed: Feb. 17, 2016

(86) PCT No.: PCT/US2016/018231
§ 371 (c)(1),
(2) Date: Jul. 20, 2017

(87) PCT Pub. No.: WO2016/133993
PCT Pub. Date: Aug. 25, 2016

(65) Prior Publication Data
US 2018/0041807 A1 Feb. 8, 2018

(30) Foreign Application Priority Data

Feb. 17, 2015 (TW) .............................. 104105554 A
Jun. 5, 2015 (TW) .............................. 104118378 A

(51) Int. Cl.
*H04N 21/4788* (2011.01)
*G11B 27/34* (2006.01)
(Continued)

(52) U.S. Cl.
CPC ..... *H04N 21/4788* (2013.01); *G06F 17/3002* (2013.01); *G06F 17/30038* (2013.01); *G06Q 30/0201* (2013.01); *G11B 27/34* (2013.01); *H04N 21/4223* (2013.01); *H04N 21/4302* (2013.01); *H04N 21/47205* (2013.01); *H04N 21/4828* (2013.01); *H04N 21/8456* (2013.01)

(58) Field of Classification Search
CPC ........... H04N 21/4788; H04N 21/4223; H04N 21/4302; H04N 21/47205; H04N 21/4828; H04N 21/8456; G06F 17/3002; G06F 17/30038; G11B 27/34
USPC ....................................................... 386/241
See application file for complete search history.

(56) References Cited

U.S. PATENT DOCUMENTS

| | | | |
|---|---|---|---|
| 8,977,104 B2* | 3/2015 | Lewis, II | H04N 5/93 386/239 |
| 2008/0144107 A1* | 6/2008 | Lieb | G06F 9/451 358/1.18 |
| 2014/0089801 A1* | 3/2014 | Agrawal | G06F 3/0484 715/719 |

* cited by examiner

*Primary Examiner* — Thai Q Tran
*Assistant Examiner* — Jose M Mesa
(74) *Attorney, Agent, or Firm* — Ingenium Patents LLC; Peter Kramer

(57) ABSTRACT

The present invention provides an interaction system and an interaction method thereof. The interaction system includes a display device, a detector, a database and a processing module. The display device plays a multimedia material. The detector acquires a comment that a user is watching the multimedia material. The comment includes a timestamp and an annotated position in the multimedia material. The database stores a plurality of interaction information related to the multimedia material. Each piece of interaction information has more than one index tag, and each of the index tag includes a timestamp and an annotated position in the multimedia material. The processing module searches for the index tag, matching the comment acquired by the detector, in the database, and then outputs the content of the interaction information corresponding to the found index tag to at least one electronic device.

18 Claims, 15 Drawing Sheets

(51) Int. Cl.
*H04N 21/4223* (2011.01)
*G06Q 30/02* (2012.01)
*G06F 17/30* (2006.01)
*H04N 21/43* (2011.01)
*H04N 21/472* (2011.01)
*H04N 21/482* (2011.01)
*H04N 21/845* (2011.01)

FIG. 8A

| | | |
|---|---|---|
| 611 | ❗ | Handbag — 631 |
| | | Dress — 633 |
| | | High heels — 635 |
| | | Vehicle — 637 |
| 613 | ● | Female — 65 |
| 615 | ✓ | Remark information — 67 |

FIG. 8B

| | | |
|---|---|---|
| 611 | ❗ | Handbag — 631 |
| | | Dress — 633 |
| | | High heels — 635 |
| 613 | ● | Female — 65 |
| 615 | ✓ | Remark information — 67 |

INTERACTION SYSTEM AND INTERACTION METHOD THEREOF

CROSS-REFERENCE TO RELATED APPLICATIONS

This non-provisional application claims priority under 35 U.S.C. § 119(a) on Patent Application No(s). 104105554 and 104118378 respectively filed in Taiwan, R.O.C. on Feb. 17, 2015 and Jun. 5, 2015, the entire contents of which are hereby incorporated by reference.

BACKGROUND

Technical Field

The disclosure relates to an interaction system and a method thereof, more particularly to an interaction system, capable of being applied to multimedia video services and providing interaction information, and a method thereof.

Related Art

In general, if a user who is watching a multimedia material, is attracted to only a certain object (e.g. a product, human, a scene, or the background music at the moment) appearing in a certain video frame image of the multimedia material, this user needs to try different ways to obtain the information about this object. For example, if a user is affected by the situation presented in a multimedia material that is playing, and then is interested in a specific product appearing in the multimedia material, the user usually needs to by himself online search keywords or search posted writings in social networks to find the information related to this product. Such a search method may bring users inconvenience and may not satisfy the users' needs in real time.

In addition, the rapid development of the digital multimedia industry has caused that multimedia materials can be used to provide broader and more various services. For example, broadcast operators can establish object information related to a multimedia material according to the video content of the multimedia material in advance, or can search for the object information related to this multimedia material according to the content of the electronic program guide (EPG) of the multimedia material as keywords and then directly provide a user, who is watching this multimedia material, with a great deal of object information as reading guidance in real time.

However, although such a method is more opportune, the user still have to passively receive a great deal of relevant object information; and all the object information found by the keywords in the EPG may not have an absolute correlation with the content of this multimedia material. Even such a method may force the user to receive too much object information which the user is not interested in. Therefore, the user may not efficiently or immediately obtain proper object information that conforms to his need, and even the user's mood to enjoy this multimedia material may be broken down.

In view of the above reasons, it is very important to provide an interaction method and system for satisfying a user's need. Therefore, players in modern emerging interaction systems not only play multimedia materials but also allow a user to intuitively select one or more objects, so as to timely handle the user's needs. However, these modern emerging interaction systems still have many disadvantages when users make selections. For example, if more than one user watches a multimedia material together and all their preferences are not the same, the limitations on the player as well as the environment may cause that not every user can intuitively do his selection of object to the player, and it may be easy to break down the other users' mood to enjoy this multimedia material. Therefore, the existing technology still has many problems to be solved.

SUMMARY

At the first aspect, the prevent invention provides an interaction system including: a display device for playing a multimedia material in at least one display region; a detector for acquiring a comment that a user is watching the multimedia material; a database for storing a plurality of interaction information related to the multimedia material, wherein each of the plurality of interaction information has more than one index tag, and the index tag includes the time information corresponding to a timestamp of a video frame image of the multimedia material displayed in the at least one display region, and/or the position information corresponding to at least one position in the at least one display region playing the multimedia material; and a processing module for surveying the index tags in the database according to the comment acquired by the detector, wherein when one of the index tags matches the comment, the processing module outputs a content of the interaction information corresponding to the index tag to at least one electronic device.

Preferably, the amount of video frame images in the multimedia material is plural.

Preferably, the comment includes an annotated behavior done by the user watching the multimedia material, an annotated time which corresponds to the timestamp that the annotated behavior is done in the duration of playing the multimedia material, an annotated position corresponding to at least one position in the at least one display region playing the multimedia material, or a combination thereof.

Preferably, the processing module selects one of the video frame images according to the annotated time obtained by the detector, and checks the index tags in the database according to the annotated behavior and/or the annotated position obtained by the detector.

Preferably, the annotated behavior is carried out on the display device and/or the electronic device. If the annotated behavior is carried out on the display device, the annotated behavior is to touch an object in a displayed content of the multimedia material played by the display device, or to move a cursor to select the object in a displayed content of the multimedia material as the user is watching the multimedia material. If the annotated behavior is carried out on the electronic device, the annotated behavior is to input the sliding path information and/or the pressing information on a touch screen of the electronic device, and/or to receive audio information by an audio receiver of the electronic device. The index tag further includes behavior information corresponding to the sliding path information, the pressing information and/or the audio information.

Preferably, the detector performs a grid survey algorithm to the multimedia material to calculate the annotated position, and a grid size used in the grid survey algorithm is decided based on a size of the object.

Preferably, when none of the index tags matches the comment, the processing module outputs a mistake command to the electronic device, so the electronic device links to a cloud society web interface through a network.

Preferably, the interaction system further includes an intelligent module for adjusting, deleting and/or increasing the display priority of the content of the interaction information outputted to the electronic device and/or deleting and/or increasing the plurality of interaction information according to a preference analysis result of the user.

Preferably, the electronic device is a smart phone, tablet computer, personal digital assistant, intelligent wearable device, television screen or a combination thereof, which includes an interactable screen.

Preferably, the interaction system further includes a camera for recording a performance to obtain the multimedia material.

At the second aspect, the present invention provides a method of operating the above interaction system, and the method includes steps of: (a) playing the multimedia material by the display device; (b) acquiring the comment controlling by the detector; (c) checking the index tags in the database according to the comment by the processing module; and (d) when at least one of the index tags matches the comment, outputting the interaction information corresponding to the index tag to the electronic device by the processing module.

Preferably, the annotated behavior is carried out on the display device and/or the electronic device. If the annotated behavior is carried out on the display device, the annotated behavior is to touch an object in a displayed content of the multimedia material played by the display device, or to move a cursor to select the object in a displayed content of the multimedia material as the user is watching the multimedia material. If the annotated behavior is carried out on the electronic device, the annotated behavior is to input the sliding path information and/or pressing information on a touch screen of the electronic device, and/or to receive audio information by an audio receiver of the electronic device. The index tag further includes behavior information corresponding to the sliding path information, the pressing information and/or the audio information.

Preferably, the step (d) further includes: outputting a mistake command to the electronic device by the processing module when none of the index tags matches the comment, so the electronic device links to a cloud society web interface or a preset webpage through a network.

Preferably, the step (a) further includes: performing at least one networking method to establish connections among the display device, the detector and the database and synchronize the display device and the detector, so the detector synchronously acquires the timestamp and the video frame image of the multimedia material.

Preferably, the interaction system further includes an intelligent module, and the method further includes a step (e): adjusting, deleting and/or increasing the display priority of the content of the interaction information outputted to the electronic device and/or deleting and/or increasing the plurality of interaction information according to a preference analysis result of the user by the intelligent module.

Preferably, the interaction system further includes a camera for recording a performance to obtain the multimedia material, and the step (a) further includes: performing at least one networking method to establish connections among the camera, the detector and the database and synchronize the camera and the detector. Therefore, the detector synchronously acquires the timestamp and the video frame image of the multimedia material.

In an embodiment of the present invention, the interaction system includes a display device, a database, at least one detector and a processing module. The display device is used to play a multimedia material consisting of video frame images. Each of the video frame images has a timestamp. The database is used to store a plurality of interaction information related to the video frame images. Each of the plurality of interaction information corresponds to an index tag. The at least one detector is used to acquire at least one annotated behavior done by at least one user who is watching the multimedia material, and record at least one timestamp, which corresponds to the acquired annotated behavior, as an annotated time. Also, at least one networking method is used to respectively establish connections among the display device, the detector and the database and synchronize the display device and the detector, so the detector synchronously acquires the timestamp of the multimedia material. The detector is disposed to an electronic device, which lacks the above display device. The processing module is used to survey the timestamps the video frame images according to the annotated time detected by the detector, so as to find at least one video frame image matching the annotated time, and respectively check the index tags in the database according to the annotated behavior. Therefore, the content of the interaction information, which matches the annotated behavior, is outputted to the electronic device.

In an embodiment of the present invention, the method is applied to an interaction system including a display device, a database, a processing module and at least one detector, wherein the display device is used to play a multimedia material consisting of video frame images, each of which has a timestamp. Preferably, the detector is disposed to an electronic device, which lacks the display device. The database is used to store a plurality of interaction information related to the video frame images, and each of the plurality of interaction information has an index tag. The method includes: using at least one networking method to respectively establish connections among the display device, the detector and the database and synchronize the display device and the detector, so the detector synchronously acquires the timestamp of the multimedia material; using the detector to acquire at least one annotated behavior done by at least one user who is watching the multimedia material, and record at least one timestamp, corresponding to the at least one annotated behavior, as an annotated time; and using the processing module to survey the timestamps of the video frame images according to the annotated time to find at least one video frame image matching the annotated time and then check the index tags in the database according to the at least one annotated behavior, so as to output the content of the interaction information matching the annotated behavior to the electronic device.

In an embodiment of the present invention, the interaction system includes a camera, a database, at least one detector and a processing module. The camera is used to record a performance to obtain a multimedia material consisting of video frame images. Each of the video frame images has a timestamp. The database is used to store a plurality of interaction information related to the video frame images, and each of the plurality of interaction information has an index tag. The at least one detector is used to detect at least one annotated behavior done by at least one user who is watching the multimedia material, and set at least one timestamp, corresponding to the at least one annotated behavior, as an annotated time. Also, at least one networking method is used to establish connections among the camera, the detector and the database and synchronize the camera and the detector, so the detector synchronously acquires the timestamp of the multimedia material. The detector is disposed to an electronic device, which lacks the camera. The processing module is used to survey the timestamp of each of the video frame images according to the annotated time to find at least one video frame image matching the annotated time and then check the index tags in the database according to the at least one annotated behavior. Therefore, the processing module outputs the content of more than one piece of interaction information matching the at least one annotated behavior to the electronic device. The interaction method further includes the following steps: using at least one networking method to respectively establish connections among the camera, the detector and the database and synchronize the camera and the detector so that the detector can synchronously acquire the timestamp of the multimedia material; surveying the timestamp of each of the video frame images according to the annotated time to find at least one video frame image matching the annotated time and then checking the index tags in the database according to the annotated behavior to output the content of the interaction information matching the annotated behavior to the electronic device.

In an embodiment of the present invention, the interaction system includes a camera, a database, a processing module and at least one detector. The camera is used to record a performance to obtain a multimedia material consisting of video frame images, each of which has a timestamp. The database is used to store a plurality of interaction information about each of the video frame images, and each of the plurality of interaction information has an index tag. The at least one detector is used to detect at least one annotated behavior done by at least one user who is watching the multimedia material, and record at least one timestamp, corresponding to the at least one annotated behavior, as an annotated time. The detector is disposed to an electronic device, which lacks the camera. The interaction method further includes the following steps: using at least one networking method to respectively establish connections among the camera, the detector and the database and synchronize the camera and the detector, so the detector synchronously the timestamp of the multimedia material; employing the processing module to survey the timestamp of each of the video frame images according to the annotated time to find at least one video frame image matching the annotated time, and then check the index tags in the database according to the at least one annotated behavior, so as to output the content of the interaction information matching the at least one annotated behavior to the electronic device.

In summary, an interaction system and an interaction method thereof in an embodiment of the present invention may timely provide a user, who is watching a multimedia material, with the interaction information about an object, appearing in the displayed content of the multimedia material, according to the user's selection of the object, so as to efficiently satisfy the user's active need. An interaction system and an interaction method thereof in another embodiment of the present invention may employ more than one detector of more than one user watching a multimedia material, to acquire respective annotated behaviors and annotated times in accordance with which the users do their respective actions on their detectors in response to one or more object categories in the one or more displayed contents of the multimedia material; after searching for a video frame image matching the respective annotated time, the present invention may search for a content of the interaction information corresponding to an index tag of the found video frame image, matching the respective annotated behavior; and the present invention may fast and timely provide the users with the interaction information about the one or more objects they want to know, and may efficiently satisfy the users' active needs, and while one user does a specific action on the user's detector in the duration of playing the multimedia material, it may not interfere with the user's watching the multimedia material.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 8A is a schematic view of the index tag of the $3000^{th}$-second video frame image stored in the database and the relevant interaction information in the second embodiment of the present invention;

FIG. 8B is a schematic view of the index tag of the $5520^{th}$-second video frame image stored in database and the relevant interaction information in the second embodiment of the present invention;

DETAILED DESCRIPTION

Figure 1:
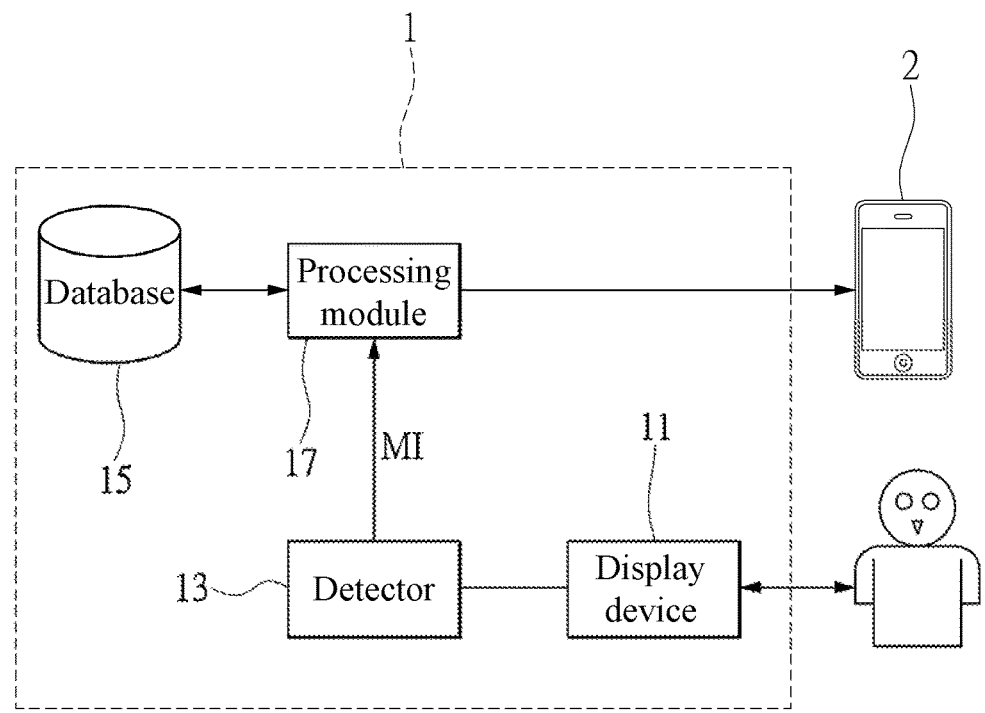
FIG. 1 is a functional block diagram of an interaction system in the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The term "annotated behavior" mentioned in the disclosure indicates that a user, who is watching a multimedia film, employs an interaction system of the present invention to actively express the user's desire in response to the content of the multimedia film. For example, the annotated behaviors done by a user who is watching a multimedia film include, but not limited to: to operate a mouse to trigger any position in a display region of a display device for playing the multimedia film, or to use a finger to directly touch at a position in a display region of a display device (that has a touch panel) for playing the multimedia film, or to input one or more hand gestures to an electronic device connected to an interaction system of the present invention, or to input sounds to an electronic device connected to an interaction system of the present invention, or a combination thereof.

The term "timestamp" mentioned in the disclosure indicates a playing time point (referred to as play time) in a specific unit of time in the duration of playing a multimedia film. A timestamp is used to mark a video frame image of a multimedia film. In a feasible situation, a timestamp is substantially equal to a playing time point in a timeline of a multimedia film.

The term "index tag" mentioned in the disclosure indicates a tag that records the relevant information for a comparison with a comment, so as to search for the relevant interaction information in the database according to the comparison. The content of a tag may include, but not limited to: the time information corresponding to a timestamp contained in a multimedia material, the position information corresponding to at least one position in a display region playing the multimedia material, and/or the behavior information. The behavior information includes, for example, but not limited to: the sliding path information and/or the pressing information left on a touch screen of an electronic device by a user, and/or the audio information received by an audio receiver of the electronic device.

The term "touch" mentioned in the disclosure indicates that a user, who is watching a multimedia material, touches (or clicks) an object appearing in the played content of the multimedia material played by a display device, or moves a cursor to select an object appearing in the played content of the multimedia material, or operates a keyboard or employs the eye-gaze scan to trigger a button after dragging an object to another space.

As follows, the drawings are used to illustrate the embodiments of the present invention in detail. However, the concept of the present invention may be embodied in different ways, and should not be restricted to the exemplary descriptions in the disclosure. Moreover, the same reference number in the drawings may be used to indicate similar components.

Please refer to FIG. 1, which is a functional block diagram of an interaction system in the first embodiment of the present invention. An interaction system 1 includes a display device 11, a detector 13, a database 15 and a processing module 17. The above components may be embodied by hardware only or by hardware circuits and firmware or software, in brief, the present invention has no limitation on the embodiments of the interaction system 1. Also, the present invention is not restricted to that the above components are integrated or separated. Note that the present invention is not restricted to that the wired or wireless data transmission between the above components.

Specifically, in the embodiment, the display device 11 is used to play multimedia materials for the user's viewing. The multimedia material is a variety of types of film (e.g. a movie, drama, variety show, or a series of pictures to successively be played) or has a variety of formats (e.g. RMVB, MPEG, AVI, WMV or MKV), and in brief, the present invention is not restricted to these examples. Moreover, the display device 11 may be a touch-type or non-touch type display device, the present invention is not restricted to these examples, and a person skilled in the art can design it according to actual requirements and application methods.

Then, the detector 13 is connected to the display device 11, and the detector 13 is used to acquire a comment that a user is watching the multimedia material. The comment herein includes a timestamp of the multimedia material and an annotated position. The database 15 is used to store a plurality of interaction information related to the multimedia material. Each of the plurality of interaction information has more than one index tag, and each of the index tags includes the timestamp of the multimedia material and the annotated position. Finally, the processing module 17 is used to survey the index tags in the database 15 according to the comment obtained by the detector 13, and when one of the index tags matches the comment, the processing module 17 may output the interaction information corresponding to the index tag to an electronic device 2.

Particularly, when a user is watching the multimedia material played by the display device 11 and the detector 13 detects a specific action done by the user, the detector 13 may record a current timestamp corresponding to the multimedia material. The specific action done by the user may be touching an object shown in the multimedia material played by the display device 11, or be moving a cursor to select an object shown in the multimedia material, and in brief, the present invention is not restricted to these examples. Therefore, in view of the above description, a person skilled in the art can understand that the so-called annotated position is a position of the object, which is currently touched or clicked by the user who is doing the specific action, in the content of the multimedia material.

Figure 2A:
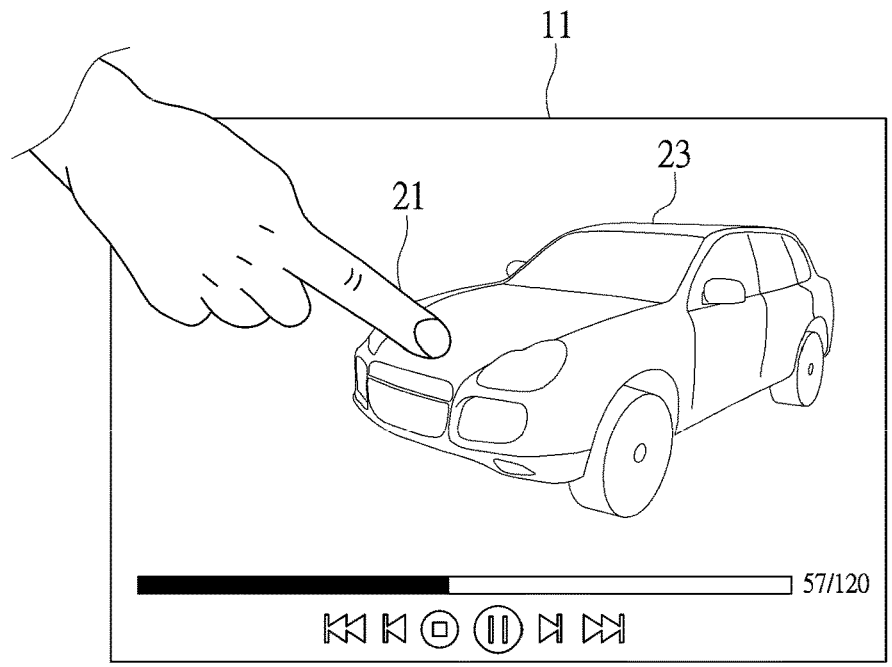
FIG. 2A is a schematic view of operation states of the display device in the interaction system in the first embodiment of the present invention.
Figure 2B:
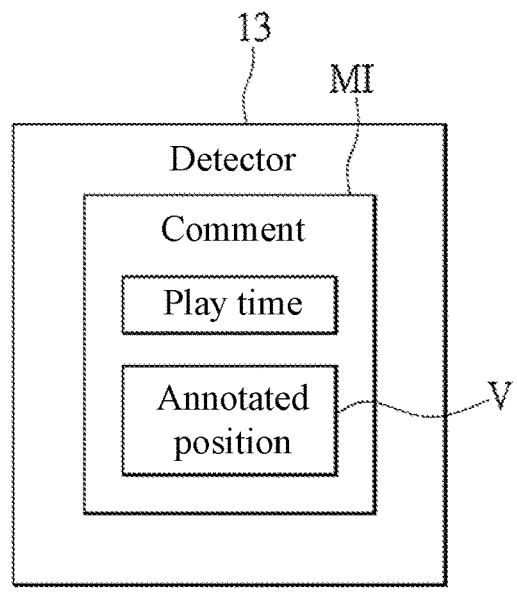
FIG. 2B is a schematic view of a comment in the first embodiment of the present invention.

For example, please also refer to FIGS. 2A and 2B, which are a schematic view of operation states of the display device in the interaction system and a schematic view of a comment in the first embodiment of the present invention, respectively. Note that the following description is used to only exemplify the present invention rather than is used to limit the present invention. Moreover, similar components in FIGS. 1, 2A and 2B are marked by similar labels and have similar functions, and they are not described in details hereinafter.

The display device 11 may be a touch panel of a tablet computer and may be playing a movie in a running time that is 120 minutes (i.e. 7200 seconds). Herein, when the user, who is watching the movie, is interested in an object appearing in the movie, the user may intuitively use a finger 21 of the user to touch the object shown by the display device 11. Then, while the detector 13 senses that the finger 21 touches the display device 11, the detector 13 may record a current play time, i.e. a current timestamp T of the movie. For example, as described in FIG. 2A, if the finger 21 touches a vehicle 23 shown in the 57$^{th}$-minute (i.e. the 3420$^{th}$-second) video frame image in the movie, the timestamp T in a comment MI obtained by the detector 13 is 3420. Note that the timestamp T using a standard unit of time (second) is for exemplary descriptions rather than the limitation of the present invention, and a person skilled in the art can design it according to actual requirements and application methods.

On the other hand, according to the above teaching, a person skilled in the art can understand that the annotated position V in the comment MI in FIG. 2B indicates a position of the vehicle 23 in the 57th-minute video frame image in the movie. In short, the positions of the objects shown in each frame image played by the display device 11 may usually be presented by grid coordinates. Accordingly, the detector 13 in the present invention may further perform a grid survey algorithm to the multimedia material to calculate the annotated position V in the comment MI.

Figure 2C:
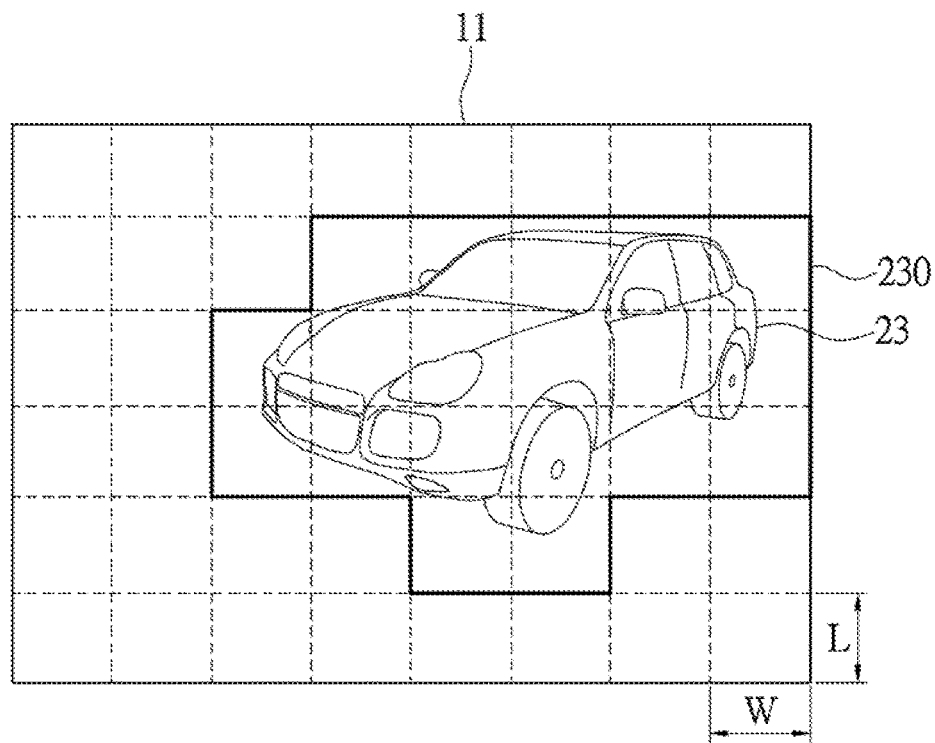
FIG. 2C is a schematic view of a grid survey algorithm in the first embodiment of the present invention.

Please refer to FIG. 1, FIGS. 2A to 2C together to understand the present invention. FIG. 2C is a schematic view of a grid survey algorithm in the first embodiment of the present invention. Similar components in FIGS. 2A and 2C are marked with similar labels and thus, will not be described in details hereinafter. For example, firstly divide the 57th-minute video frame image of the movie into more than one grid having a constant size of W×L, and the grid region, in which a vehicle 23 appears, is defined as an object block 230; and then, it may be obvious that where the finger 21 tries to touch in the 57th-minute video frame image of the movie falls in the object block 230. Therefore, the annotated position V obtained by the detector 13 indicates all grids in the object block 230. Note that the above design of a grid survey algorithm is not used to limit the present invention. A person skilled in the art can design the grid survey algorithm according to actual requirements or applicable methods, and the present invention has no limit in the detailed design method of a grid survey algorithm. Moreover, likewise, even if the user selects the vehicle 23 shown in the 57th-minute video frame image of the movie by moving a cursor, the detector 13 in the present invention is still able to recognize that the annotated position V obtained by the detector 13 may also indicate all grids in the object block 230 if where the cursor clicks falls in the object block 230.

Note that in the grid survey algorithm, the present invention has no limitation on whether the grid size (e.g. W and L) is constant or not. In short, the grid size may be decided according to the object size appearing in the video frame image. For instant, if the vehicle 23 appearing in the 57th-minute video frame image of the movie is zoomed in, a relatively-large grid size may be used to divide the 57th-minute video frame image of the movie.

Figure 2D:
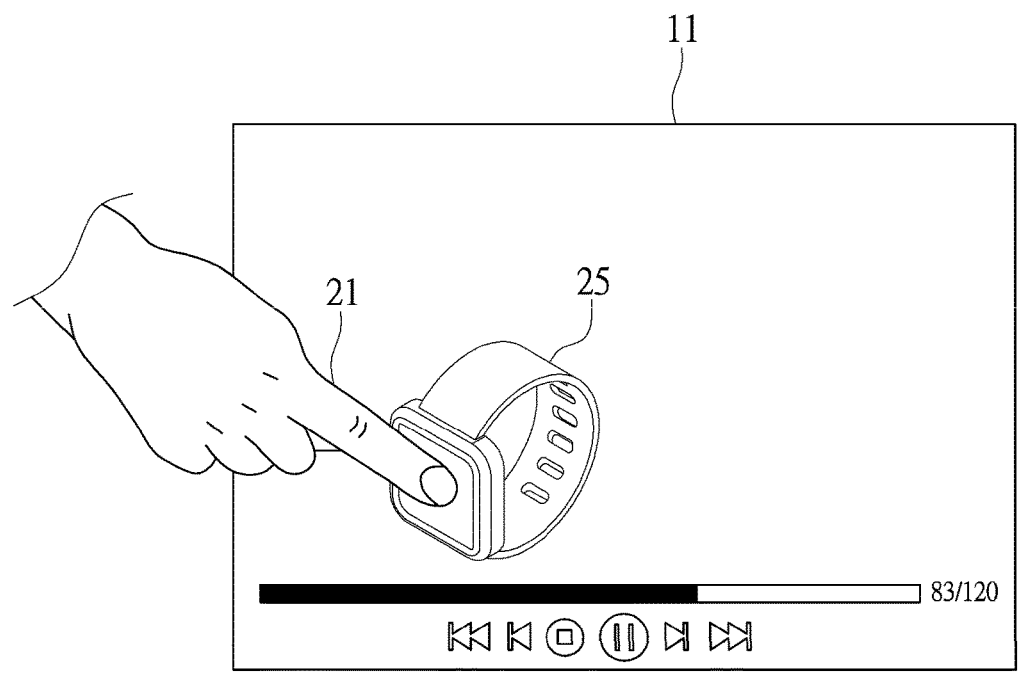
FIG. 2D is a schematic view of the operation situation of another display device in the interaction system in the first embodiment of the present invention.
Figure 2E:
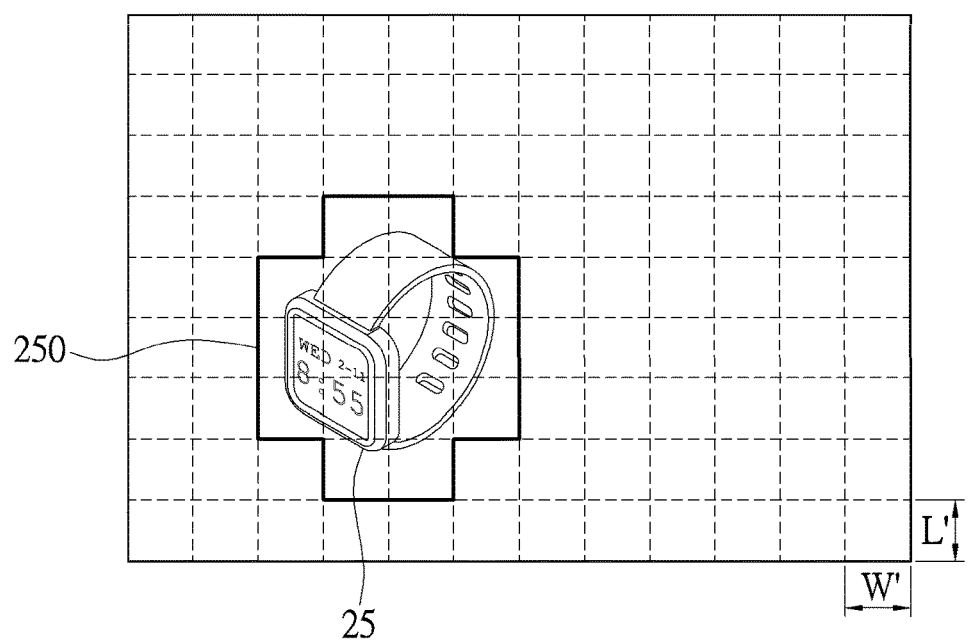
FIG. 2E is a schematic view of another grid survey algorithm in the first embodiment of the present invention.

Please refer to FIG. 2D and FIG. 2E. FIG. 2D is a schematic view of the operation situation of another display device in the interaction system in the first embodiment of the present invention, and FIG. 2E is a schematic view of another grid survey algorithm in the first embodiment of the present invention. Since each object appearing in the 83rd-minute (i.e. the 4980th second) video frame image of the movie has a relatively-small size, a relatively-small grid size (e.g. W' and L') may be used to divide the 83rd-minute video frame image of the movie, and then the detector 13 could calculate a proper annotated position V (e.g. all grids in the object block 250 in FIG. 2E) for a relatively-small size object (e.g. the watch 25 in FIG. 2E).

Accordingly, as described above, a person skilled in the art should understand that the above grid design method could be used to efficiently define a proper annotated position V for any object (e.g. product, scenes or humans) appearing in the multimedia material played by the interaction system 1 in the first embodiment of the present invention.

Figure 2F:
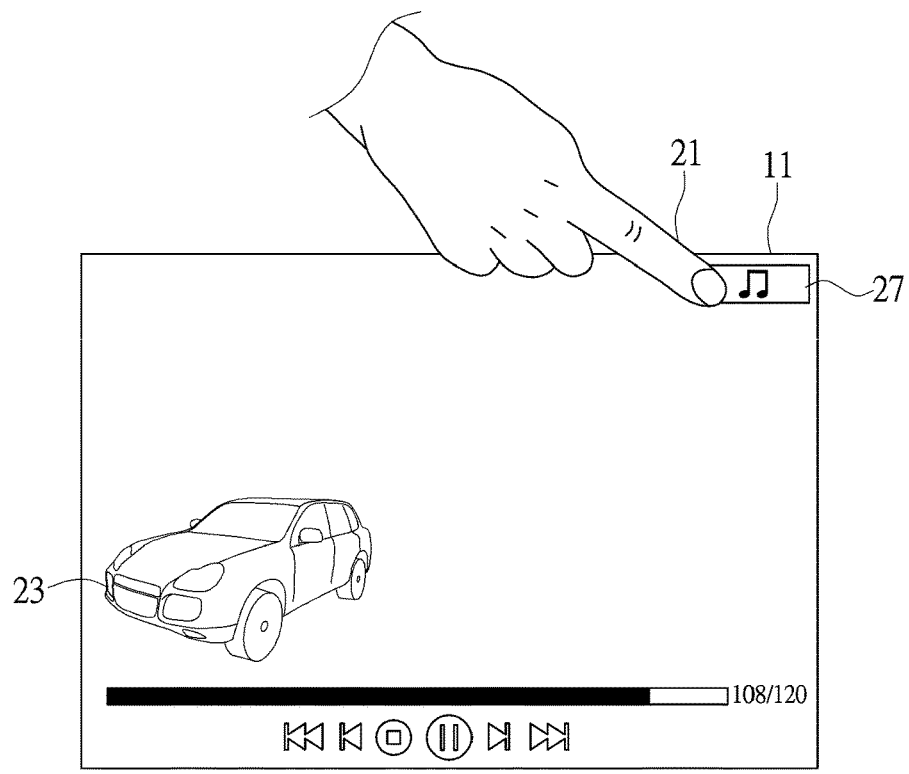
FIG. 2F is a schematic view of the operation situation of yet another display device in the interaction system in the first embodiment of the present invention.
Figure 2G:
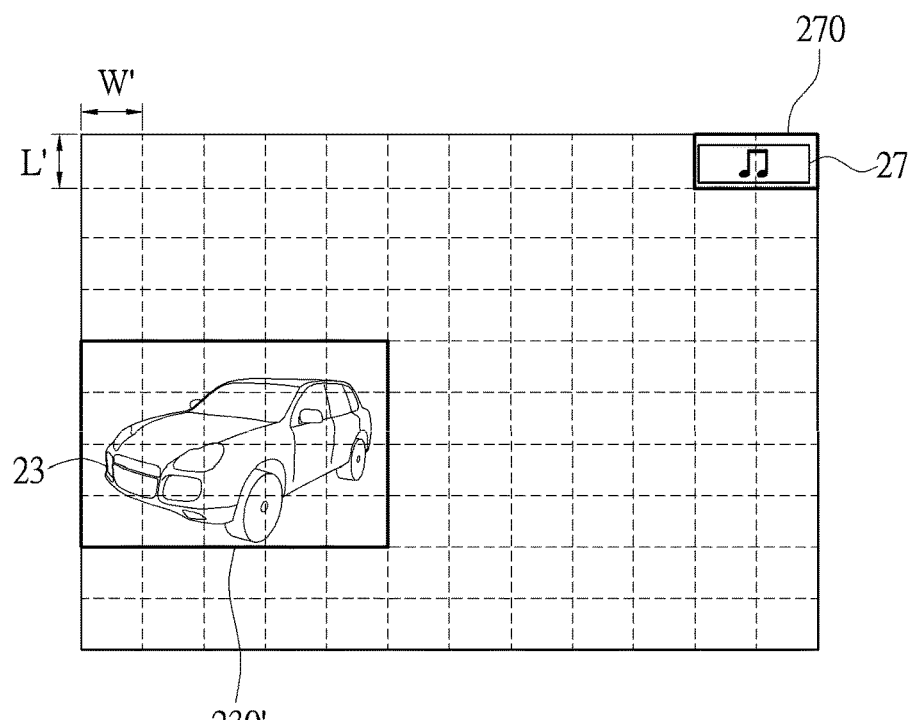
FIG. 2G is a schematic view of yet another grid survey algorithm in the first embodiment of the present invention.

On the other hand, the user may be interested in the background music of the multimedia material, so the interaction system 1 in the first embodiment of the present invention may further consider establishing a proper annotated position V for a non-physical object. Please refer to FIG. 2F and FIG. 2G, FIG. 2F is a schematic view of the operation situation of yet another display device in the interaction system in the first embodiment of the present invention, and FIG. 2G is a schematic view of yet another grid survey algorithm in the first embodiment of the present invention. The similar components in FIGS. 2A and 2G are marked with similar labels, and their details are not repeatedly described hereinafter.

For example, a broadcast operator may set a musical note icon 27 at the upper right part of the 108th-minute fragment starting at the 6480th-second frame image in the movie. Therefore, when the user is interested in the background music played during the 108th-minute fragment of the movie, the user may directly use the finger 21 to touch the musical note icon 27 shown by the display device 11 at the 6480th-second, so the timestamp T in the comment MI obtained by the detector 13 is indicated by 6480, and the annotated position V is expressed by all grids in the object block 270.

In conclusion, when the user is interested in an object shown in the multimedia material that is being displayed, the user could intuitively do a specific action (e.g. touch or move a cursor to click) to this object to select the object, so the detector 13 may record the number of the second-based time and the grid positions that this object appears in the multimedia material. Then, the interaction system 1 in the present invention may further real time provide the user with the interaction information about this object to satisfy the user's active requirements.

In view of the above description, a person skilled in the art should understand that the interaction information stored in the database 15 may express the advanced information about one or more objects in which the user is interested. Therefore, the interaction information may be associated with at least one of one or more products, one or more properties, one or more scenes, one or more humans, one or more dialogues and one or more background music in the displayed content of the multimedia material. For example, as described in FIG. 2A, the interaction information stored in the database 15 may be the model information about the vehicle 23, e.g. the brand, the engine displacement, the maximum horsepower, the variable transmission system or the interior equipment. In addition, for example, as described in FIG. 2F, the interaction information stored in the database 15 may the information, such as songs, artists, lyricists or composers, about the background music indicated by the musical note icon 27.

Furthermore, the interaction system 1 in the present invention may cooperate with one or more marketers or retailers so that the user could directly contact with the one or more marketers or retailers through the interaction information, and the one or more marketers or retailers may timely handle the user's shopping mentality and enhance the possibility of purchasing the product of this object. In brief, the present invention has no limitation on the detailed content of the interaction information, and a person skilled in the art could design it according to actual requirements or applicable methods.

On the other hand, a person skilled in the art should understand that the index tag of each piece of interaction information stored in the database 15 indicates the time and position of this object appearing in the multimedia material. In addition, because each object may repeatedly appear in the multimedia material, each piece of interaction information may have more than one index tag. For example, as shown in FIG. 2A and FIG. 2F, the vehicle 23 may appear in the 57th-minute and the 108th-minute fragments of the movie, and the positions of the vehicle 23 appearing in the fragments at the two time points respectively may be different, so the interaction information of the vehicle 23 stored in the database 15 may have two different index tags, wherein the timestamp of one index tag is 3420, and the annotated position of this index tag indicates all grids in the object block 230, the timestamp of the other index tag is 6480, and the annotated position of the other index tag indicates all grids in the object block 230.

In other words, the two index tags corresponds to the same interaction information of the vehicle 23, so no matter if the user is interested in the vehicle 23 at the 57th or 108th minute during the movie, the interaction system 1 in the present invention may efficiently provide the user with a piece of proper interaction information about the vehicle 23. Therefore, before the display device 11 plays the multimedia material, the broadcast operator needs to use the grid survey algorithm conformed to the detector 13 to calculate the position of this object appearing in the multimedia material at the appearing time of this object, so as to efficiently establish one or more index tags for each piece of interaction information in the database 15. In brief, the present invention has no limitation on the how a broadcast operator embodies the database 15, and a person skilled in the art could design it according to actual requirements and applicable methods.

Therefore, as described above, a person skilled in the art should understand that when the processing module 17 in FIG. 1 is used to search the index tag in the database 15 according to the comment obtained by the detector 13, it indicates a searching method based on one or more lookup tables. Particularly, the processing module 17 may be any central processing unit having a computing ability, and after analyzing the received comment MI, the processing module 17 surveys the index tags in the database 15 to search for the index tag that is absolutely conformed to the timestamp T and the annotated position V in the comment MI, and then outputs the interaction information corresponding to this index tag to the electronic device 2. In brief, such a lookup table manner is just exemplary rather than is used to limit the present invention, and a person skilled in the art could design the searching method used by the processing module according to actual requirements or applicable methods. In addition, the foregoing electronic device 2 may be a mobile communication device, desk-top computer and notebook, and the present invention is not restricted to these examples. Therefore, while the user is watching the multimedia material played by the display device 11, the user could obtain the interaction information about the object, in which the user is interested, via another electronic device 2 with the user.

Figure 3:
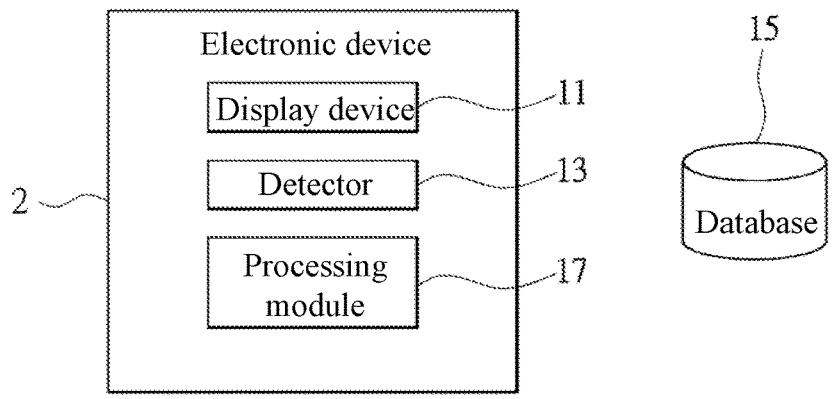
FIG. 3 is a functional block diagram of an electronic device produced based on the interaction system in the first embodiment of the present invention.

In addition, in view of the above teaching, a person skilled in the art could deduce other embodiments of the interaction system 1. For example, please refer to FIG. 3, which is a functional block diagram of an electronic device produced based on the interaction system in the first embodiment of the present invention, wherein the same component in FIGS. 1 and 3 is marked by the same label and has the same function, and it is not repeatedly described hereinafter. In short, the display device 11, the detector 13 and the processing module 17 may be assembled in the same electronic device 2, and the database 15 is outside the electronic device 2. In this way, the user could watch the multimedia material played by the display device 11 of the electronic device 2 and also could receive the interaction information about the object, in which the user is interested, from the processing module 17 in the electronic device 2. Note that the embodiments of the foregoing electronic device are used for the exemplary description rather than are used to limit the present invention.

In another example, if the processing module 17 does not find out any index tag matching the comment MI in the database 15, the processing module 17 may output a mistake command to the electronic device 2 to notify the user that the interaction system 1 has not found out any interaction information about the object. Note that the occurrence of such a situation may be because this object is unusual and lacks relevant information, and the broadcast operator has not established proper interaction information about this object. Therefore, in the interaction system 1 in the embodiment of the present invention, when none of the index tags matches the comment, the processing module 17 may output the mistake command to the electronic device 2 and may also let the electronic device 2 link to a cloud society web interface through a network. The cloud society web interface may be provided by a broadcast operator or other cloud service providers, and the present invention has no limitation on this example. In brief, the main spirit of the cloud society web interface is to provide the user or a cloud service provider with a platform of an online chatroom for compilation discussions.

For example, when the user is interested in a certain product appearing in the multimedia material but the processing module 17 does not find out any interaction information about this product in the database 15, the user may further link to a cloud society web interface through the processing module 17 and then publish an inquiry about this product on this cloud society web interface. Similarly, when another user or the operator, through the cloud society web interface, knows that this user is interested in this specific product, another user or the operator may answer this inquiry about this product on the cloud society web interface to provide the user with the information about this product in which the user is interested.

Figure 4:
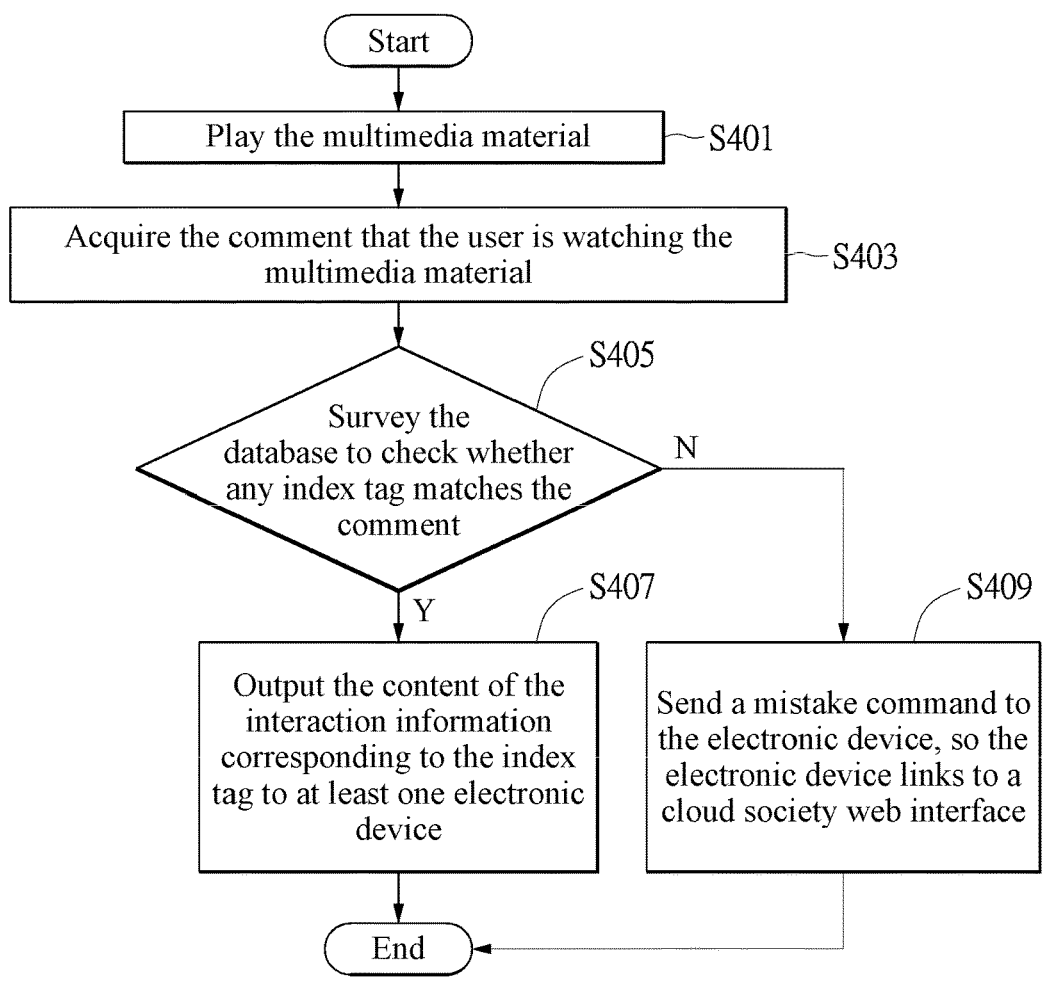
FIG. 4 is a flow chart of an interaction method in the first embodiment of the present invention.

To describe the operation process of the interaction system, the present invention further provides the first embodiment of an interaction method of the interaction system. Please refer to FIG. 4, and FIG. 4 is a flow chart of an interaction method in the first embodiment of the present invention. The method may be carried out on the interaction system 1 in FIG. 1, so please refer to FIG. 1 to understand the interaction method. Moreover, the detailed process can be referred to the previous embodiment and is not repeatedly described hereinafter.

Firstly, in step S401, by the display device 11, play the multimedia material for a user to watch. Then, in step S403, by the detector 13, acquire the comment MI that the user is watching the multimedia material. The comment MI includes the timestamp T and the annotated position V corresponding to the multimedia material. Next, in step S405, by the processing module 17, survey the index tags in the database 15 according to the comment MI obtained by the detector 13 to check whether any index tag matches the comment MI. Finally, in step S407, when one of the index tags matches the comment MI, the processing module 17 is used to output the interaction information corresponding to the index tag to at least one electronic device 2.

On the other hand, as described above, in step S409, when none of the index tags matches the comment MI, the processing module 17 outputs a mistake command to the electronic device 2, so the electronic device 2 links to a cloud society web interface through a network. However, such an interaction is one of the embodiments of the interaction method but is not used to limit the present invention.

Figure 5:
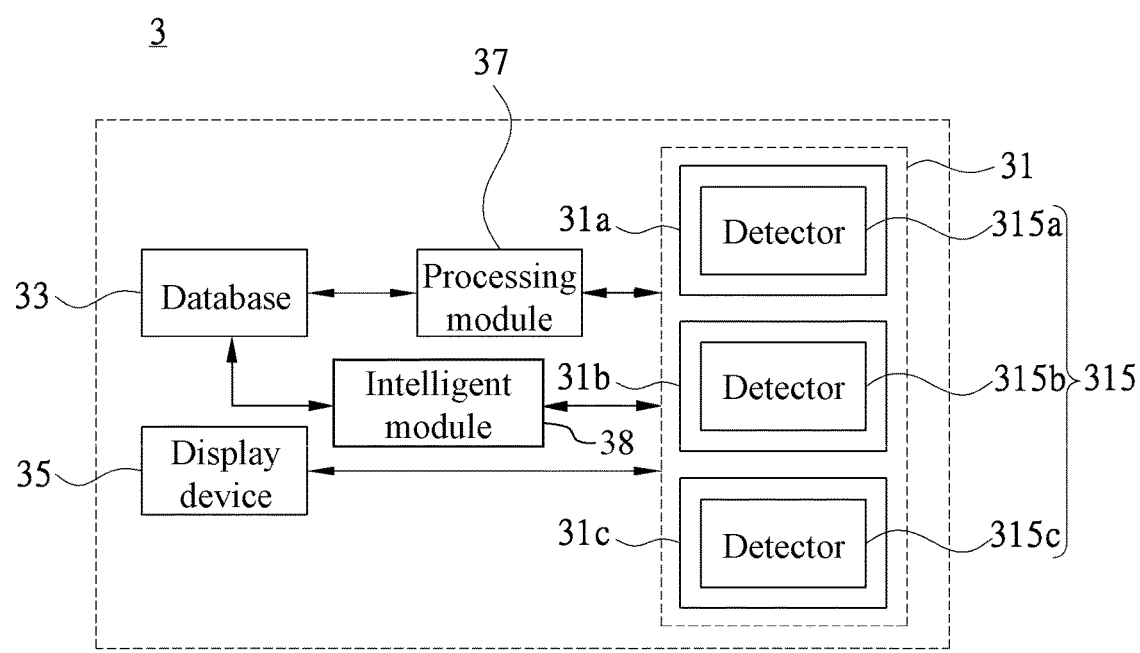
FIG. 5 is a functional block diagram of an interaction system in the second embodiment of the present invention.

Please refer to FIG. 5, and FIG. 5 is a functional block diagram of an interaction system in the second embodiment of the present invention. An interaction system 3 includes a database 33, a display device 35, at least one detector 315 and a processing module 37. In this embodiment, the detector 315 is disposed in an electronic device 31, and the display device 35 is not a display device (not marked with a label) disposed in the electronic device 31. Note that the detector 315 and the electronic device 31 in FIG. 5 are representative names (also referred to as antonomasias), that is, the electronic device 31 represents one of the electronic devices 31a, 31b and 31c and the detector 315 represents one of the detectors 315a, 315b and 315c, so as to concisely clarify the connections and transmissions among the display device 35, the database 33 and the detector 315 that is disposed in the electronic device 31 rather than to represent all electronic devices or all detectors. Therefore, the following description about the structure and operation of the interaction system 3 still uses the detector 315 and the electronic device 31 as representative names. The above components may be embodied by hardware only or by hardware circuits and firmware or software, in brief, the present invention has no limitation on the embodiments of the interaction system 3. Also, the present invention is not restricted to that the above components are integrated or separated. Note that the present invention is not restricted to that the wired or wireless data transmission between the above components. After the interaction system 3 establishes its networking, the display device 35 may be synchronous to the detector 315, and the present invention is not restricted to the synchronization method, in which the detector 315 may obtain the timestamps related to the multimedia material for the synchronization between the display device 35 and the detector 315 after the display device 35 sends the relevant information of a multimedia material (e.g. the timestamp, filename or total timestamp of the multimedia material) to the detector 315.

In details, in this embodiment, the display device 35 is used to play the multimedia material consisting of video frame images. The multimedia material may be a variety of videos (e.g. a movie, drama, variety show, or a series of successive pictures to be played) or have a variety of formats (e.g. RMVB, MPEG, AVI, WMV or MKV) or be read out from a variety of sources (e.g. an optical disk, the data sent by a multimedia provider, or film strip). In brief, the present invention has no limitation on the type and embodiment of the multimedia material.

Next, the at least one detector 315 is used to detect an annotated behavior of at least one user who is watching the multimedia material, and record at least one timestamp, corresponding to the detected annotated behavior, as an annotated time. The database 33 is used to store a plurality of interaction information about each of the video frame images and the index tags of each of the video frame images. The interaction information may be a variety of types of information (e.g. product information, property information, scenes information, human information, dialogue information, musical information or remark information), and each piece of interaction information has at least one index tag, which may be a variety of clicking actions (e.g. a single click, a double click, two single click during a period of time, two double click during a period of time, more than two clicks during a period of time, or the like), or may be a variety of sliding paths (e.g. a straight line from up to down, a straight line from left to right, a curve, an annular line, a rectangular line, or the like), or may be a variety of pressing methods (e.g. pressing the left key on the mouse once or more then one time or pressing a variety of keys on a keyboard for a variety of interaction information during a period of time), or may be a variety of shaking methods (e.g. shaking a gyroscope once or more then one time during a period of time), or may be a variety of audio information (e.g. a variety of index tags decided by a variety of audio information received by an audio receiver). In brief, the present invention has no limitation on the type of the interaction information and the embodiment of the index tag. In other words, the interaction information is classified based on the index tag. Accordingly, a person skilled in the art can understand that the above index tag may be designed or changed according to actual requirements or application methods in view of the foregoing description.

Finally, the processing module 37, according to the annotated time, surveys the timestamp of each of the video frame images to find at least one video frame image matching the annotated time, and compares the annotated behavior with the index tags of each piece of interaction information of the found video frame image in the database 33, so as to output the interaction information, corresponding to the index tag matching the annotated behavior, to the electronic device 31.

Particularly, when the detector 315 detects an annotated behavior done on the detector 315 by the user who is watching the multimedia material played by the display device 33, the detector 315 may meanwhile record at least one timestamp, corresponding to the annotated behavior, as an annotated time. The processing module 37 surveys the timestamp of each of the video frame images according to the annotated time to find at least one video frame image matching the annotated time, and compares the annotated behavior with the index tags of each piece of interaction information of the found video frame image in the database 33, thereby outputting the interaction information, which corresponds to the index tag matching the annotated behavior, to the electronic device 31. The annotated behavior done on the detector 315 by the user may be a variety of clicking actions (e.g. a single click, a double click, two single click during a period of time, two double click during a period of time, more than two clicks during a period of time, or the like), or may be a variety of sliding paths (e.g. a straight line from up to down, a straight line from left to right, a curve, an annular line, a rectangular line, or the like), or may be a variety of pressing method (e.g. pressing the left key on the mouse once or more then one time or pressing a variety of keys on a keyboard for a variety of interaction information during a period of time), or may be a variety of shaking methods (e.g. shaking a gyroscope once or more then one time during a period of time), or may be a variety of audio information (e.g. a variety of annotated behaviors decided by a variety of audio information received by an audio receiver). In brief, the present invention has no limitation on the embodiment of the annotated behavior. By referring to the above description, a person skilled in the art can understand that the annotated behavior may be designed and changed according to actual requirements or application methods.

Figure 6A:
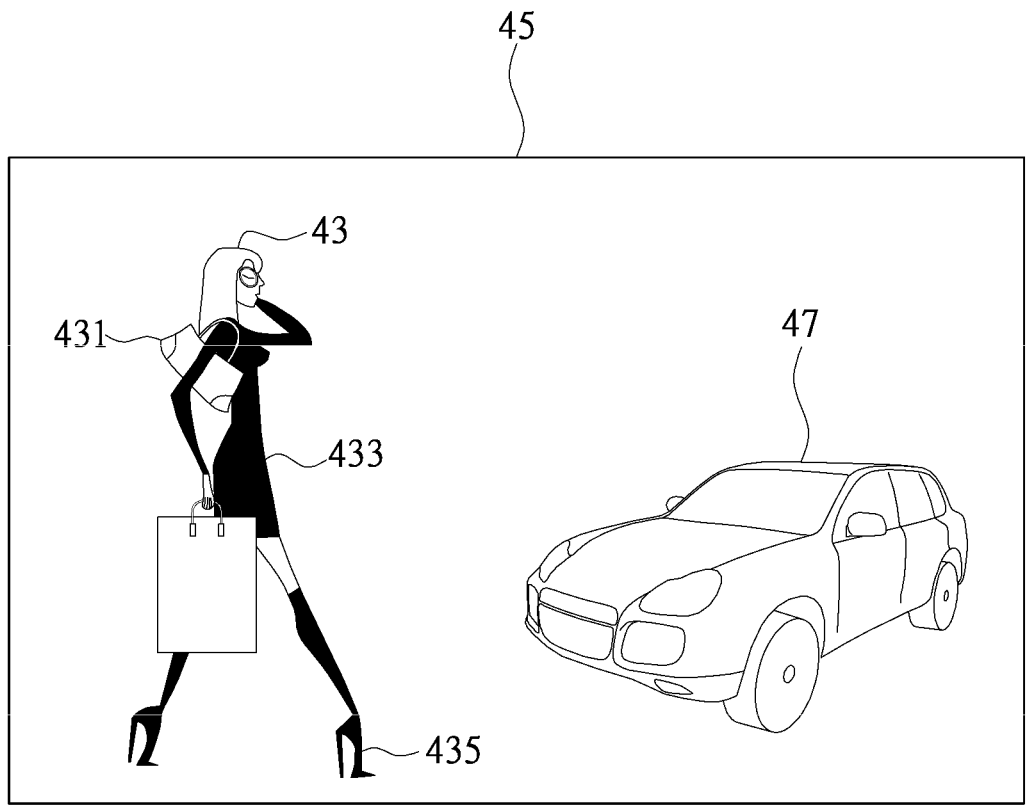
FIG. 6A is a schematic view of the operation situation of the interaction system at the $3000^{th}$ second in the second embodiment of the present invention.
Figure 7A:
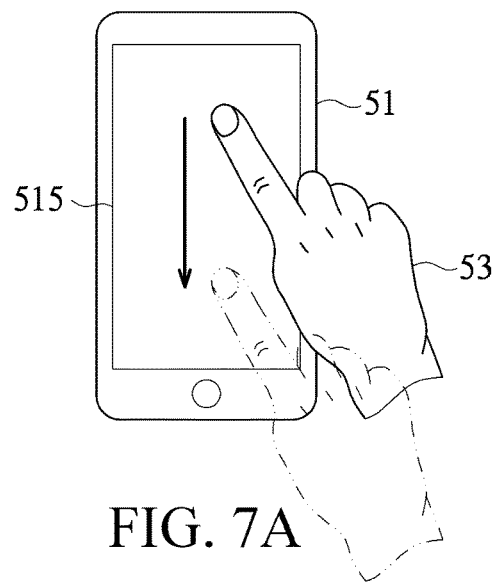
FIG. 7A and FIG. 7B are schematic views of acquiring the user's annotated behavior by the detector in the second embodiment of the present invention.
Figure 7B:
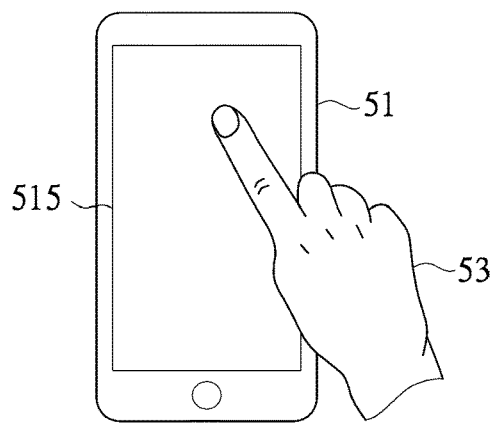

For example, refer to FIGS. 6A, 7A, 7B and 8A, FIG. 6A is a schematic view of the operation situation of the interaction system at the $3000^{th}$ second in the second embodiment of the present invention, FIG. 7A and FIG. 7B are schematic views of acquiring the user's annotated behavior by the detector in the second embodiment of the present invention, and FIG. 8A is a schematic view of the index tag of the $3000^{th}$-second video frame image stored in the database and the relevant interaction information in the second embodiment of the present invention. Note that the following description is only exemplary for clarifying the present invention rather than limiting the present invention. Also, some similar components in FIGS. 6A, 7A, 7B, 8A and in FIG. 5 are marked with similar labels and have the same function, and they will not repeatedly be described hereinafter.

Please refer to FIG. 6A, the display device 45 may be a liquid crystal display device and may be playing a 180-minute movie, and the display device 45 may also be a touch or non-touch type display device or a projection type display device. The present invention is not restricted to these instances of the display device 45, and a person skilled in the art can design it according to actual requirements or application methods.

Then, please refer to FIGS. 7A and 7B, the detector 515 and the electronic device 51 may be integrated together. The detector 515 may be a touch panel, a photographing component, a mechanical pressible component, a gyroscope sensor, an audio receiver or an internet of things (IOT) device. The electronic device 51 may be a mobile communication device (e.g. a mobile phone, a tablet computer or a PDA), a wearable device (e.g. a wrist watch or a wrist strap) or an embedded device (that is embedded in a chair or a table, for example). In brief, the present invention has no limitation on the embodiments of the detector and the electronic device. When attracted to a certain object appearing in the movie that is being played, the user may use a finger 53 to do an annotated behavior on the detector 515. Then, when the detector 515 detects the annotated behavior done by the finger 53, the detector 515 may record an annotated time corresponding to the movie at the moment. For example, as shown in FIGS. 6A, 7A and 7B, if the finger 53 touches the detector 515 once, this behavior may correspond to a human in the 50th-minute (i.e. the 3000th-second) video frame image of the movie, and the detector 515 may sense this annotated behavior as a single touch and record this annotated time as the 3000th second; and if the finger 53 slides from up to down on the detector 515, this behavior may correspond to a product shown in the 50th-minute (the 3000th-second) video frame image of the movie, and the annotated behavior detected by the detector 515 is a sliding path from up to down and the annotated time recorded by the detector 515 is the 3000th second. In other words, while the movie is being played by the same display device 45, different users may do different annotated behaviors to different types of objects they are interested in respectively. For instance, as shown in FIG. 6A, the user operating the electronic device 41a may do an annotated behavior to a human in the movie, the user operating the electronic device 41b may do an annotated behavior to a product, and the user operating the electronic device 41c may do an annotated behavior to music. Note that the foregoing timestamp takes the second as a unit of time for only the exemplary description rather than limiting the present invention and a person skilled in the art can design it according to actual requirements and application methods. Therefore, as described above, different users may be interested in different object types shown in the movie so that the detector may detect different annotated behaviors and different annotated times.

Then, please refer to FIGS. 5 and 8A, the processing module 37 surveys the timestamp of each of the video frame images according to the annotated time to find at least one video frame image matching the annotated time, and compares the annotated behavior with the index tags of each piece of interaction information of the found video frame image in the database 33, thereby outputting at least one piece of interaction information matching the annotated behavior to the electronic device 31. If the annotated behavior is a single touch, it may correspond to a human index tag 613, and the interaction information 65 of the human category may be outputted; and if the annotated behavior is a sliding path from up to down, it may correspond to a product index tag 611, and the interaction information 63 of the product category (including the interaction information content 631 of the handbag, the interaction information content 633 of the dress, the interaction information content 635 about the high heels, and the interaction information content 637 about the vehicle) may be outputted.

Accordingly, as described above, a person skilled in the art can understand that in the multimedia material played by the interaction system in the second embodiment of the present invention, the index tag corresponding to the annotated behavior may be used to efficiently determine which object (e.g. a product, a scenes or a human) the user is interested in, thereby providing the user with the information about the relevant object in the category attracting the user.

On the other hand, the user may watch the multimedia material from the middle, so the following situations may occur to the interaction system in the second embodiment of the present invention. The interaction information in the database may further include the remark information for the user to understand. For example, please refer to FIGS. 6A and 8A, if the user operating the electronic device 41a attempts to watch the movie that has been played by the display device 45 for 3000 seconds, and would like to fast understand the story background of the movie, the user could paint a curve as an annotated behavior on the detector of the electronic device 41a, and the annotated time of the annotated behavior may be the 3000th second. Next, the processing module 37 surveys the timestamp of each of the video frame images according to the annotated time to find at least one video frame image matching the annotated time, and then compares the annotated behavior with the index tags of each piece of interaction information of the found video frame image in the database 60 to obtain an index tag 615 of the remark information and output the remark information as the interaction information 67 to the electronic device 41a, so the user may fast know the synopsis of the movie. Moreover, even if the information the user wants to know does not appear in the current video frame image, this information may be deduced from one or more objects appearing in the current video frame image. For example, the vehicle 47 appearing in the video frame image in FIG. 6A may be a used car in the 1950s, and if the user operating the electronic device 41b wants to know which films in that generation the vehicle 47 appears in, the user could leave a curve as an annotated behavior on the detector 515 of the electronic device 41b and from the foregoing method learn which film in the 1950s the vehicle 47 appears in. In other words, the information having a certain correlation with the video frame image or with this film may be stored in the interaction information 67 of the remark information (e.g. if the Forbidden City appears in the frame image, the user may, from the remark information, learn that the film is about the story in the Qing Dynasty; or if the user wants to know this story but cannot watch this film from the beginning, the remark information may also let the user fast know the story background), and the present invention has not limitation on the content of the interaction information of the remark information.

In view of the above teaching, a person skilled in the art should understand that the interaction information stored in database 60 may express the advanced information about the object category which the user is interested in. Therefore, the interaction information is associated with a product, a property, a scene, human, a dialogue, music or the remark information, in the displayed content of the multimedia material. For example, as shown in FIGS. 6A and 8A, the interaction information content 637 of the vehicle stored in the database 60 may be model information about the vehicle 47, such as the brand, the engine displacement, the maximum horsepower, the manufacture year, the interior equipment or the variable transmission system, or may be the interaction information content 631 of the handbag, such as the brand or the designer.

Moreover, the interaction system in the second embodiment of the present invention may cooperate with one or more marketers or retailers to allow the user to directly contact with the one or more marketers or retailers through the interaction information, so as to properly catch the user's shopping mentality and enhance the possibility of purchasing this product. In brief, the present invention has no limitation on the detailed content of the interaction information, and a person skilled in the art could design it according to actual requirements or application methods.

On the other hand, a person skilled in the art should understand that the index tag of each piece of interaction information in the database may correspond to the annotated behavior done by the user while this object appearing in the multimedia material. Furthermore, more than one object appearing in the same video frame image may belong to the same category, so the category of the object in the video frame image corresponding to each pair of an annotated time and an annotated behavior may have a variety of situations. For example, as shown in FIGS. 6A and 8A, a female 43, who carries a handbag 431 and wears a dress 433 and high-heels 435, and a vehicle 47 appear in the video frame image, and an annotated behavior done by the user who is interested in products may correspond to the handbag 431, the dress 433, the high-heels 435 or the vehicle 47 shown in the video frame image. In other words, if more than two objects in the same category appear in the same video frame image and the user produces the annotated behavior and the annotated time corresponding to this category on the detector, the index tags in this category in the database 60 may correspond to the annotated time and the annotated behavior, and all the interaction information in this category may be outputted. Therefore, the interaction system in the second embodiment of the present invention may further include an intelligent module 38 for adjusting the output priorities of the contents of the plurality of interaction information and/or deleting and/or increasing at least one of the contents of the plurality of interaction information according to a preference analysis result of the user. The preference analysis result may be the user's past purchase history, the user's past watch history to the user's interests, the preference information set in the user's registration, or a set of the user's special annotated behaviors done on the detector, and the present invention is not restricted to these instances. In other words, while more than two contents of the interaction information in the same category need to be outputted, their output priorities may be arranged or deleted according to the user's preference analysis result, whereby the content of the interaction information, in which the user is more interested, may have a higher priority, and the user could earlier watch it.

Figure 6B:
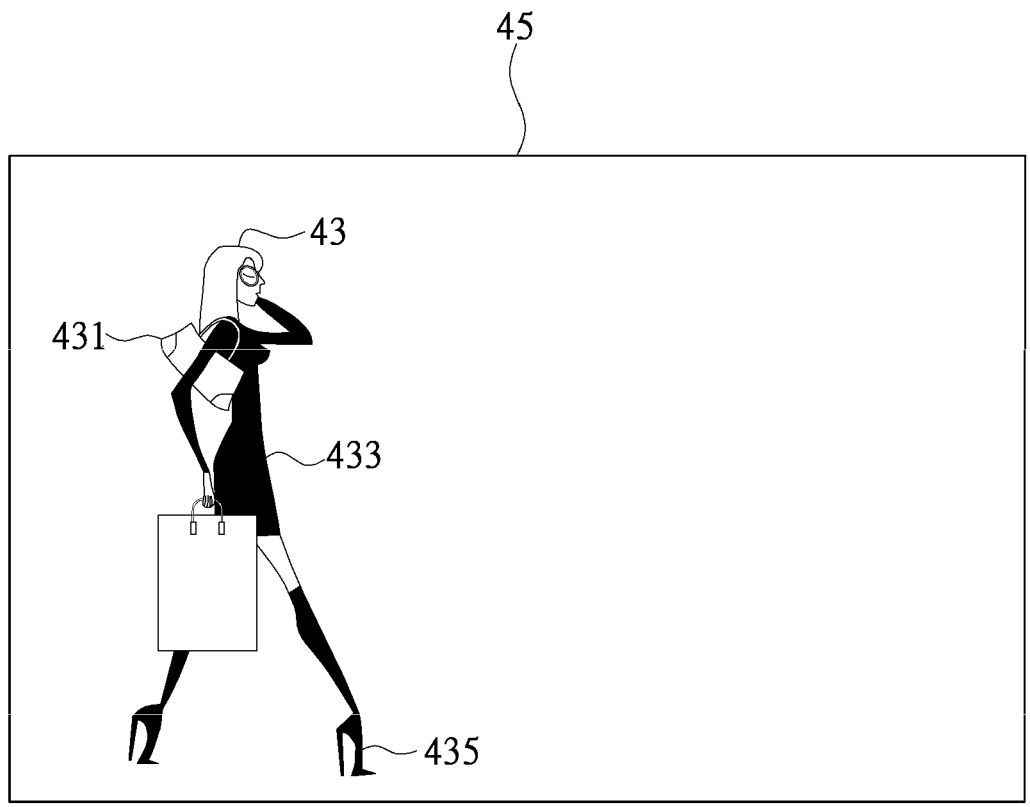
FIG. 6B is a schematic view of the operation situation of the interaction system at the $5520^{th}$ second in the second embodiment of the present invention.
Figure 6B:
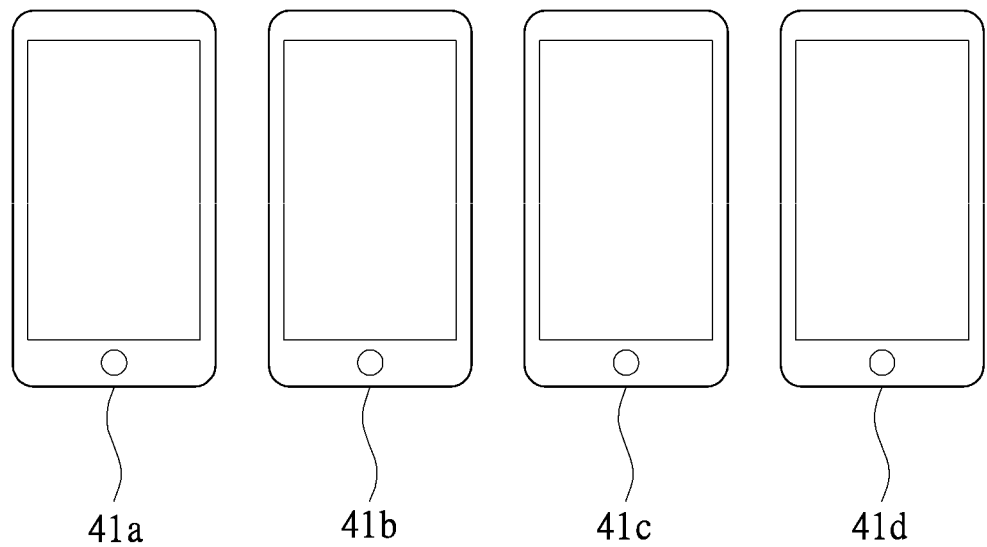
Figure 7C:
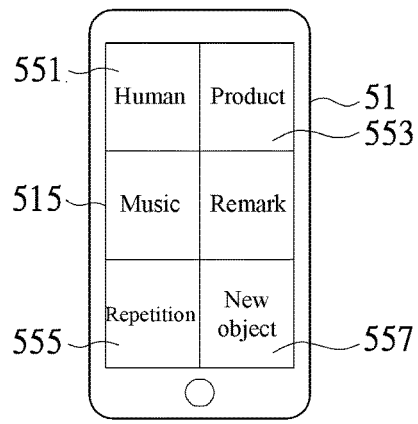
FIG. 7C is a schematic view of acquiring the user's annotated behavior by another detector in the second embodiment of the present invention.

On the other hand, the detector may provide more than one touch region, and a different touch region may indicate an annotated behavior corresponding to a different object category. These touch regions may further include touch regions respectively indicating repetitions and new objects. Through these different touch regions, the intelligent module 38 could determine whether the user has ever done an annotated behavior in response to the object when the user does an annotated behavior on the detector, whereby the intelligent module 38 may accurately determine one or more objects in which the user is interested. For example, please refer to FIG. 6A, FIG. 6B, FIG. 7C, FIG. 8A and FIG. 8B, FIG. 6B is a schematic view of the operation situation of the interaction system at the 5520 second in the second embodiment of the present invention, FIG. 7C is a schematic view of acquiring the user's annotated behavior by another detector in the second embodiment of the present invention, and FIG. 8B is a schematic view of the index tag of the $5520^{th}$-second video frame image stored in database and the relevant interaction information in the second embodiment of the present invention. FIG. 6A illustrates that a vehicle 47 and a female 43 appear at the 3000th second, and FIG. 6B illustrates that only the female 43 appears at the 92nd-minute (i.e. the 5520th second). If the user repeats touching the touch region 555 once after touching the product touch region 553 of the detector 515 in FIG. 7C once at the 3000th second and then touching the product touch region 553 once at the 5520th second, the intelligent module 38 may determine that the product the user is interested in at the 3000th second is the handbag 431, the dress 433 or the high-heels 435 put on the female 43 appearing in the two video frame images rather than the vehicle 47, according to the user's two annotated behaviors and following repeated annotated behavior. Therefore, the intelligent module 38 may control the database 60 to output the interaction information content 631 of the handbag, the interaction information content 633 of the dress and the interaction information content 635 of the high-heels.

On the contrary, if the user touches the new object touch region 557 once after touching the product touch region 553 of the detector 515 in FIG. 7C once at the 3000th second and then touching the product touch region 553 once at the 5520th second, the intelligent module 38 may determine that the user is interested in the vehicle 47 appearing at the 3000th second, and is also interested in the dress 433, the handbag 431 or the high-heels 435 put on the female 43 appearing at the 5520th second. In brief, the intelligent module 38 may determine whether an object in a category in which the user is interested appears repeatedly, according to the user's two or more than two annotated behaviors and according to the occurrence of a repeated annotated behavior or the occurrence of a new object annotated behavior. Therefore, if the user does a repeated annotated behavior in response to the repeated appearance of an object attracting the user, the intelligent module 38 could accurately determine an object in the category in which the user is interested.

On the other hand, the electronic device may be used to control the content played by the display device. For example, as shown in FIG. 5, the content played by the display device 35 may be controlled by the electronic device 31. For example, what the display device 35 plays may be the contents of television channels provided by a cable television operator, and the user may use the electronic device 31 to switch to and select one of the contents of the television channels; alternatively, what the display device 35 plays may be stored in the database 33, and the electronic device 31 may control the display device 35 to play what has been stored in the database 33. In brief, the present invention has no limitation on the source of data played by the display device and how the electronic device controls the display device.

On the other hand, the electronic device may be an embedded device, and for example, the electronic device may be embedded in a sofa or a table. When the user is watching a multimedia material played by a display device, the user could do an annotated behavior to an electronic device embedded in a sofa or table in response to the user's preference. The present invention has no limitation on what such an embedded device is embedded in.

On the other hand, the detector may be disposed to an electronic device, which may not include a display device for playing the multimedia material. The processing module respectively surveys each of the video frame images and the index tags related to the video frame image in the database according to the annotated time and the annotated behavior to find a certain video frame image matching the annotated time and then output a content of the interaction information, corresponding to each index tag of this video frame image matching the annotated behavior, to another electronic device. In other words, the detector which is used to produce the annotated time and the annotated behavior by the user may be disposed to a first electronic device, and a second electronic device may be used to receive the content of the interaction information. In brief, the present invention has no limitation on the embodiment of an electronic device receiving the interaction information.

Figure 9:
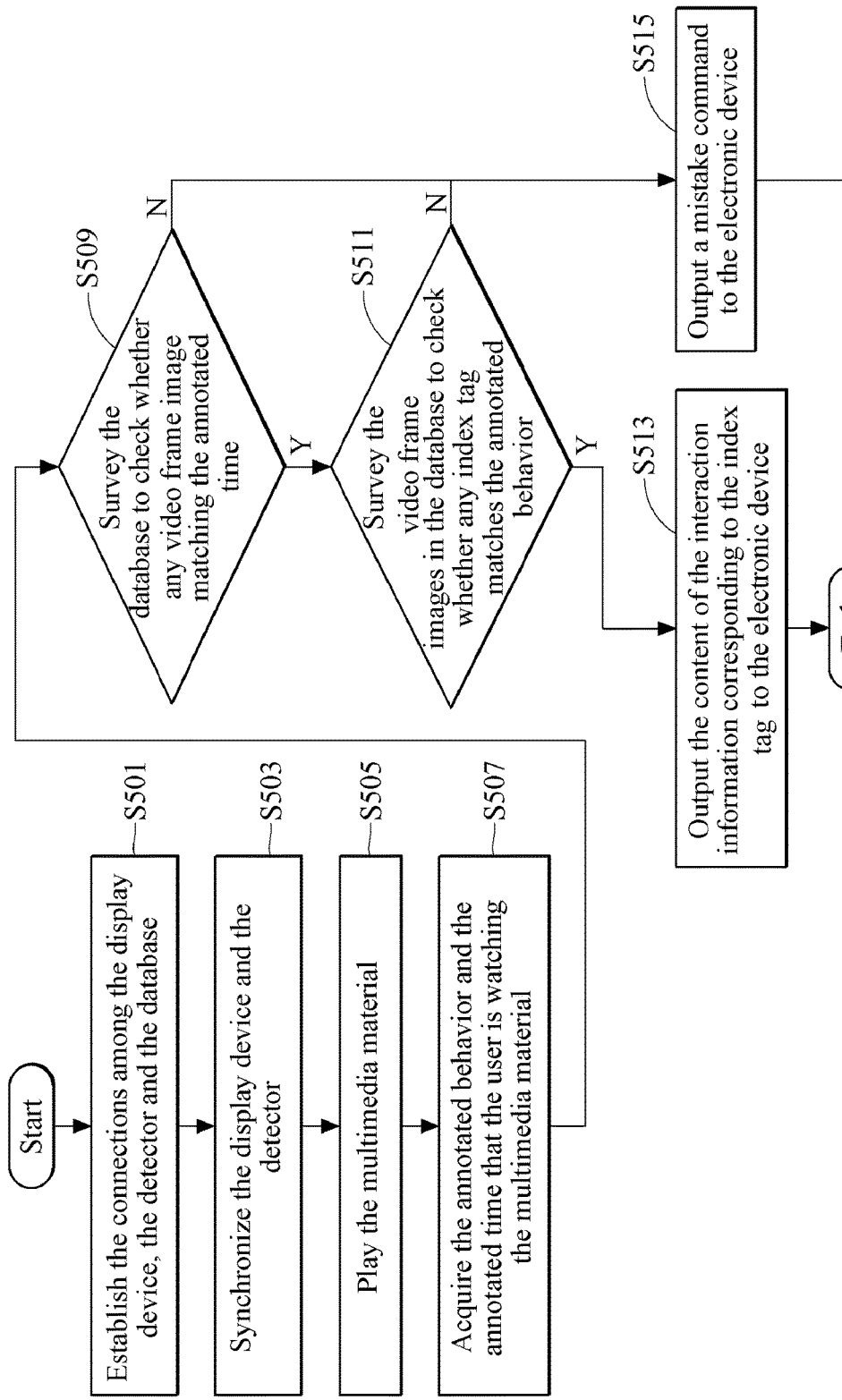
FIG. 9 is a flow chart of a method of providing the interaction information in the second embodiment of the present invention.

In order to illustrate the operation of the interaction system, the present invention provides the second embodiment of the interaction method of the interaction system. Please refer to FIG. 9, and FIG. 9 is a flow chart of a method of providing the interaction information in the second embodiment of the present invention. The interaction method in this embodiment may be carried out by the interaction system 3 in FIG. 5, and thus, also refer to FIG. 5. In addition, the detailed process can be referred to the previous embodiment, and it is not repeatedly described hereinafter.

Firstly, in step S501, the connections among the display device 35, the detector 315 and the database 33 are established, and in step S503, the display device 35 and the detector 315 are synchronized. Second, in step S505, the display device 35 is used to play the multimedia material for the user to watch. Third, in step S507, the detector 315 is used to acquire the annotated behavior and the annotated time that the user is watching the multimedia material. Next, in step S509, the processing module 37 is used to survey the timestamps of the video frame images in the database 33 according to the annotated time acquired by the detector 315 to find the video frame image matching the annotated time. Then, in step S511, the processing module 37 is used to compare the annotated behavior acquired by the detector 315 with the index tags of a plurality of interaction information of the found video frame image in the database 33 to determine whether any index tag matches the annotated behavior. Finally, in step S513, when one of the index tags matches the annotated behavior, the processing module 37 is used to output a content of the interaction information corresponding to the index tag to the electronic device 31.

On the other hand, in step S515, when none of the timestamps of the video frame images matches the annotated time or when none of the index tags matches the annotated behavior, the processing module 37 is used to output a mistake command to the electronic device 31. However, the foregoing process is one of the embodiments of the interaction method and is not used to limit the present invention.

Figure 10:
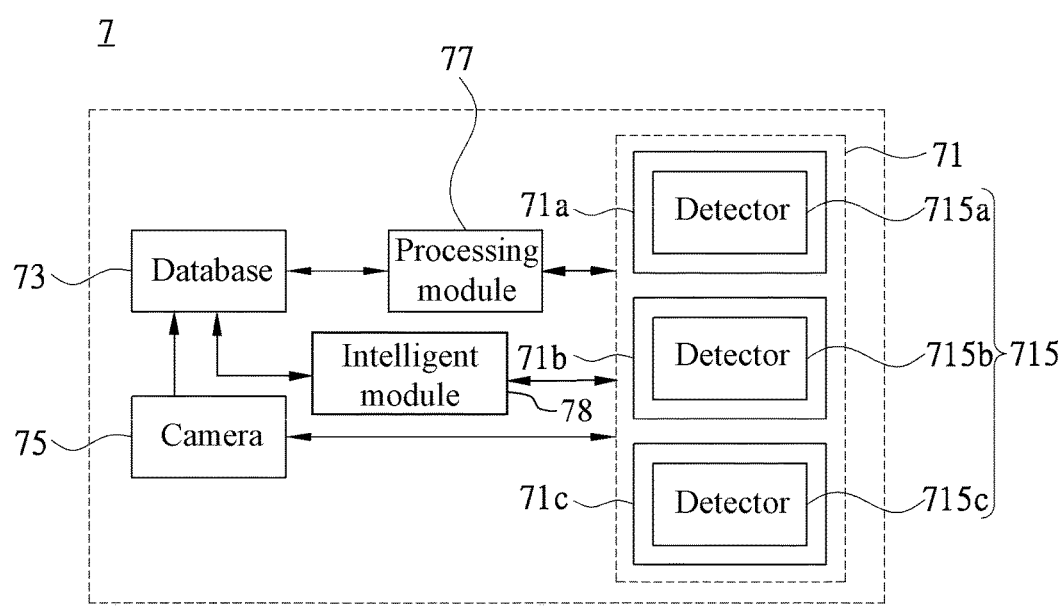
FIG. 10 is a functional block diagram of an interaction system in the third embodiment of the present invention.

Another embodiment of the present invention provides an interaction system, which provides a user with the information about one or more objects that appear in a performance and attract the user when the user is watching the performance. Please refer to FIG. 10, and FIG. 10 is a functional block diagram of an interaction system in the third embodiment of the present invention. An interaction system 7 includes a database 73, a camera 75, at least one detector 715 and a processing module 77. The detector 715 may be disposed in an electronic device 71, and the electronic device 71 may not include the camera 75. Note that the detector 715 and the electronic device 71 in FIG. 10 may be representative names; that is, the electronic device 71 may be a representative name of one of the electronic devices 71a, 71b and 71c, and the detector 715 is a representative name of one of the detectors 715a, 715b and 715c. Such representative names may be used to concisely illustrate the connections and transmissions among the camera 75, the database 73 and the detector 715 that is disposed in the electronic device 71, rather than represent all electronic devices or all detectors. The following descriptions about the structure and operation of the interaction system 7 mention the detector 715 and the electronic device 71 in the same principle. The above components may be embodied by hardware only or by hardware circuits and firmware or software, in brief, the present invention has no limitation on the embodiments of the interaction system 7. Also, the present invention is not restricted to that the above components are integrated or separated. Note that the present invention is not restricted to that the wired or wireless data transmission between the above components. After the interaction system 7 establishes its networking, the camera 75 may be synchronized with the detector 715. The synchronization methods may include: after the camera 75 sends the relevant information of recording the multimedia material (e.g. a start time of recording the multimedia material, the filename, or a total recording time of the multimedia material) to the detector 715, the detector 715 acquires the timestamps related to the multimedia material, thereby synchronizing the camera 75 with the detector 715. The present invention is not restricted to this instance of the synchronization method.

In detail, the camera 75 may be used to record a performance to obtain a multimedia material consisting of video frame images and store the multimedia material in the database 73, and each of the video frame images may have a timestamp in the multimedia material. The performance may be a variety of types of performance (e.g. a product exhibition, a music performance, a dance performance, a drama performance, a conic talk show or a variety show), and in brief, the present invention has no limitation on the types of performance.

The at least one detector 715 may be used to acquire an annotated behavior of at least one user who is watching a performance, and to set at least one timestamp, corresponding to that the annotated behavior is acquired, to be an annotated time. The database 73 may be used to store a plurality of interaction information of each of the video frame images and one or more index tags of each piece of interaction information. The interaction information may be a variety of categories of information (e.g. product information, property information, scene information, human information, dialogue information, musical information or remark information), and each piece of interaction information may have at least one index tag. The index tag may be a variety of clicking actions (e.g. a single click, a double click, or two or more than two single clicks or double clicks during a period of time), or a variety of sliding paths (e.g. a straight line from up to down, a straight line from left to right, a curve, an annular line, a rectangular line, or the like), or a variety of pressing methods (e.g. pressing the left key on the mouse once or more then one time or pressing a variety of keys on a keyboard for a variety of interaction information during a period of time), or a variety of shaking methods (e.g. shaking a gyroscope once or more then one time during a period of time), or a variety of audio information (e.g. a variety of index tags decided by a variety of audio information received by an audio receiver). In brief, the present invention has no limitation on the categories of interaction information and the embodiments of the index tag. In other words, the category of the interaction information may be based on the index tag. Accordingly, a person skilled in the art can understand that the index tags can be designed or changed according to actual requirements or application methods.

The processing module 77 may be used to survey the timestamp of each of the video frame images according to the annotated time to find at least one video frame image matching the annotated time, and compare the annotated behavior with the index tags of each piece of interaction information of the found video frame image in the database 73, thereby outputting a content of the interaction information, corresponding to the index tag matching the annotated behavior, to the electronic device 71.

Particularly, if the detector 715 detects an annotated behavior done on the detector 715 by the user who is watching a performance, the detector 715 may also record at least one time stamp of the multimedia material at the moment as an annotated time. The interaction system 7 may survey the timestamp of each of the video frame images according to the annotated time to find at least one video frame image matching the annotated time, and then compare the annotated behavior with the index tags of each piece of interaction information of the found video frame image in the database 73 to output a content of the interaction information, corresponding to the index tag matching the annotated behavior, to the electronic device 71. The annotated behavior done on the detector 715 by the user may be a variety of clicking actions (e.g. a single click, a double click, or two or more than two single clicks or double clicks during a period of time), or a variety of sliding paths (e.g. a straight line from up to down, a straight line from left to right, a curve, an annular line, a rectangular line, or the like), or a variety of pressing methods (e.g. pressing the left key on the mouse once or more then one time or pressing a variety of keys on a keyboard for a variety of interaction information during a period of time), or a variety of shaking methods (e.g. shaking a gyroscope once or more then one time during a period of time), or a variety of audio information (e.g. a variety of annotated behaviors may be defined by a variety of audio information received by the audio receiver). In brief, the present invention has no limitation on the embodiment of the annotated behavior. Therefore, a person skilled in the art should understand that the annotated behavior can be designed or changed according to actual requirements or application methods.

For example, refer to FIGS. 7A, 7B, 8A and 11A, and FIG. 11A is a schematic view of the operation situation of the interaction system at the $3000^{th}$ second in the third embodiment of the present invention. Note that the following description is an exemplary description rather than the limitation of the present invention. Also, some similar components in FIGS. 7A, 7B, 8A, 10 and 11A are marked by similar labels and have the same function, and they will not repeatedly be described hereinafter.

Figure 11A:
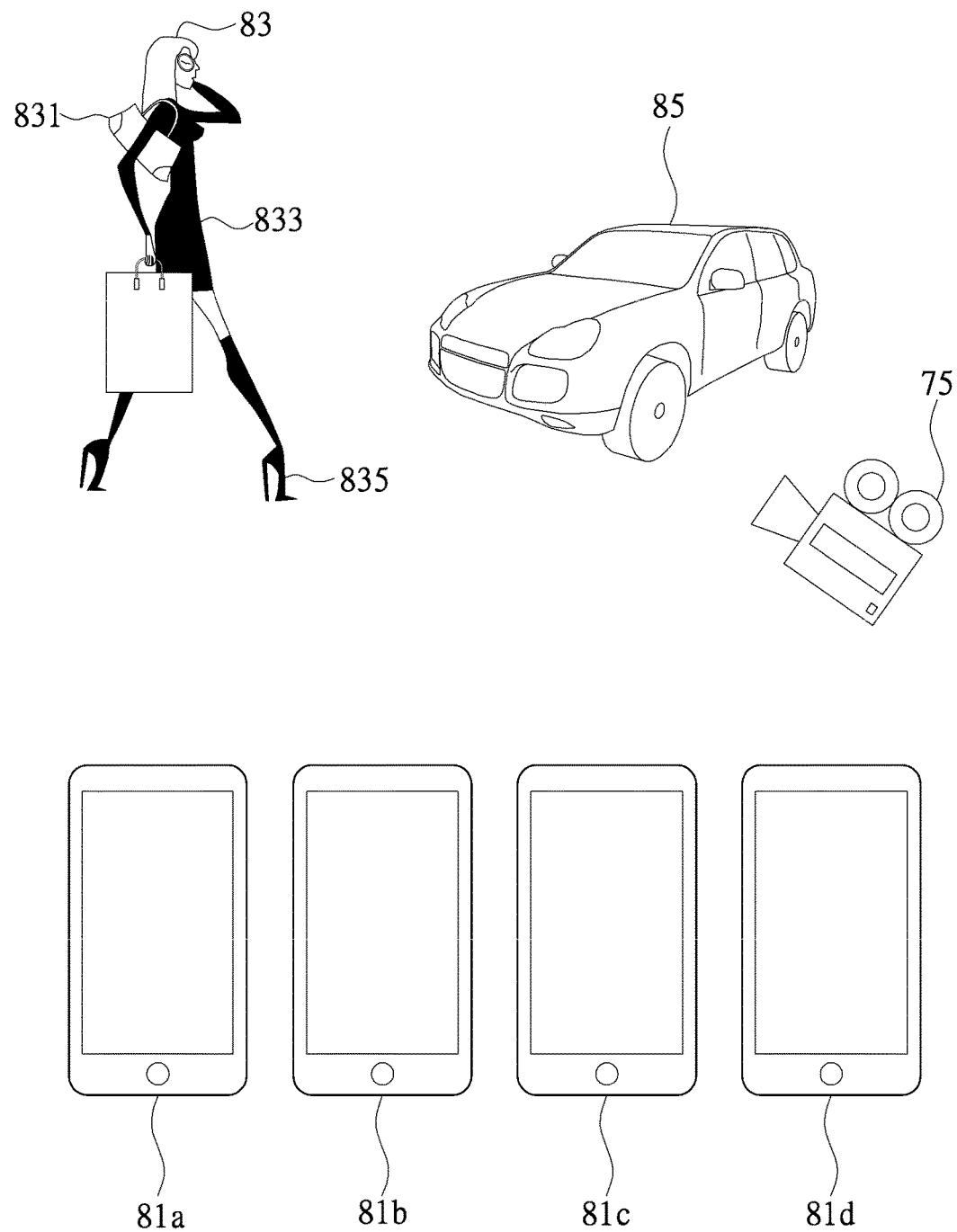
FIG. 11A is a schematic view of the operation situation of the interaction system at the $3000^{th}$ second in the third embodiment of the present invention.

Please refer to FIG. 11A, the camera 75 may be a video camera that is recording images of a 180-minute performance, and store them as a multimedia material consisting of video frame images. The present invention is not restricted to that the camera 75 is a video camera of a mobile device or a handheld video camera, and a person skilled in the art can design it according to actual requirements and application methods.

Then, refer to FIG. 7A and FIG. 7B, the detector 515 may be integrated with the electronic device 51, and the detector 515 may be a touch panel, a photographing component, a mechanical pressible component, a gyroscope, an audio receiver or an internet of things (IOT) device. The electronic device 51 may be a mobile communication device (e.g. a mobile phone, a tablet computer, or a PDA), a wearable device (e.g. a wrist watch or a hand strap), or an embedded device (e.g. a device embedded in a chair, a table or the like). In brief, the present invention has no limitation on the embodiments of the detector and the electronic device. When the user, who is watching the performance, may be attracted to one or more objects appearing in the performance, the user may leave an annotated behavior on the detector 515 via the finger 53. Then, while the detector 515 detects this annotated behavior done by the finger 53, the detector 515 may record an annotated time corresponding to the performance at the moment. For example, as shown in FIGS. 7A, 7B and 11A, if the finger 53 touches the detector 515 once as an annotated behavior, it may correspond to the human category in the 50th-minute (the 3000th-second) video frame image of the multimedia material, the annotated behavior acquired by the detector 515 may a single touch, and the annotated time acquired by the detector 515 may be the 3000th second; if the finger 53 leaves a sliding path from up to down as an annotated behavior on the detector 515, it may correspond to the product category in the 50th-minute (the 3000th second) video frame image of the multimedia material, the annotated behavior acquired by the detector 515 may be the sliding path from up to down, and the annotated time acquired by the detector 515 may be the 3000th second. In other words, while watching a performance, a different user may be attracted to a different object category and then do a different annotated behavior. For example, as shown in FIG. 11A, a user operating the electronic device 81a may do an annotated behavior to the human category, a user operating the electronic device 81b may do an annotated behavior to the product category, and a user operating the electronic device 81c may do an annotated behavior to the musical category. Note that the above timestamp using a standard unit of time (second) is for an exemplary description rather than the limitation of the present invention, and a person skilled in the art can design it according to actual requirements and application methods. Accordingly, when a different user is interested in a different object category in the movie, the detector may acquire a different annotated behavior and a different annotated time.

Then, please refer to FIGS. 8A and 10, the processing module may check the timestamp of each of the video frame images according to the annotated time to find at least one video frame image matching the annotated time, and then compare the annotated behavior with the index tag of each piece of interaction information of the found video frame image in the database 73 to output a content of the interaction information matching the annotated behavior to the electronic device 71. If the annotated behavior is a single touch and corresponds to the human index tag 613, the interaction information content 65 of the human may be outputted; and if the annotated behavior is a sliding path from up to down and corresponds to the product index tag 611, the interaction information content 63 of the product category (including the interaction information content 631 about the handbag, the interaction information content 633 about the dress, the interaction information content 635 about the high-heels and the interaction information content 637 about the vehicle) may be outputted.

Accordingly, as described above, a person skilled in the art can understand that in an interaction system in the present invention, the correlation between an annotated behavior and an index tag may could efficiently used to express one or more objects (e.g. products, scenes or humans) appearing in the multimedia material and determine which category of object the user is interested in. In this way, the interaction system provides the user with the information about one or more objects in the category in which the user is interested.

On the other hand, even if the information, which the user would like to know, may not be presented in a current video frame image, this information may be deduced from one or more objects appearing in the current video frame image. For example, as shown in FIGS. 8A and 11A, the vehicle 85 appearing in a performance may be a sedan produced in A.D. 2000, and if the user operating the electronic device 81b wants to know which other performances the vehicle 85 appears in, the user could paint a curve as an annotated behavior on the detector of the electronic device 81b. In this way, the interaction system may let the user know which other performances the vehicle 85 appears in. In other words, the information having a sufficient correlation with the content of this video frame image, or the information about this film may be contained in the interaction information content 67 of the remark information (e.g. if the Forbidden City appears in a performance, the remark information may tell the user that this performance may be a story in the Qing Dynasty), and the present invention has no limitation on the content of the interaction information of the remark information.

In view of the above description, a person skilled in the art should understand that the interaction information stored in the database 60 may express the advanced information about the object category which the user is interested in. Therefore, the interaction information may be associated with one or more products, properties, scenes, humans, dialogues, music or the remark information in the displayed content of the multimedia material. The interaction information content 637 about the vehicle stored in the database 60 may be the model information about the vehicle 85, e.g. the brand, the engine displacement, the maximum horsepower, the manufacture year, the interior equipment or the variable transmission system, or may be the interaction information content 631 about the handbag, e.g. the brand or designer.

In addition, the interaction system in the third embodiment of the present invention may further cooperate with one or more marketers or retailers to allow the user to directly contact with the one or more marketers or retailers through the interaction information, so as to timely handle the user's shopping mentality and enhance the possibility of purchasing the product of this object. In brief, the present invention has no limitation on the detailed content of the interaction information, and a person skilled in the art may design it according to actual requirements and application methods.

On the other hand, a person skilled in the art should understand that the index tag of each piece of interaction information stored in the database may correspond to an annotated behavior done by the user in response to an object appearing in the multimedia material. In addition, the same video frame image may have more than one object belonging to the same category, so the category of an object appearing in the video frame image corresponding to a pair of an annotated time and an annotated behavior may have various situations. For example, as shown in FIG. 8A and FIG. 11A, a female 83 and a vehicle 85 appear in performance, and the female 83 carries a handbag 831 and wears a dress 833 and high-heels 835; and if the user does an annotated behavior in response to the user's interest in the product category, the annotated behavior may correspond to the handbag 831, the dress 833, the high-heels 835 or the vehicle 85 appearing in this video frame image. In other words, when more than two objects belonging to the same category appear in the same video frame image and the annotated behavior and the annotated time corresponding to this category are produced on the detector, the index tag of this category in the database 60 may be linked to the annotated behavior and the annotated time, and each piece of interaction information corresponding to the index tag of this category may be outputted. Therefore, an interaction system in the third embodiment of the present invention may further include an intelligent module 78 for adjusting the output priorities of the contents of a plurality of interaction information and/or deleting and/or increasing at least one of the contents of the plurality of interaction information according to a preference analysis result of the user. The preference analysis result may be the user's past purchase history, the user's past watch history to the user's interests, the preference information set in the user's registration, or a set of the user's special annotated behaviors done on the detector, and the present invention is not restricted to these instances. In other words, while more than two contents of the interaction information in the same category need to be outputted, their output priorities may be arranged or deleted according to the user's preference analysis result, whereby the content of the interaction information, in which the user is more interested, may have a higher priority, and the user could earlier watch it.

Figure 11B:
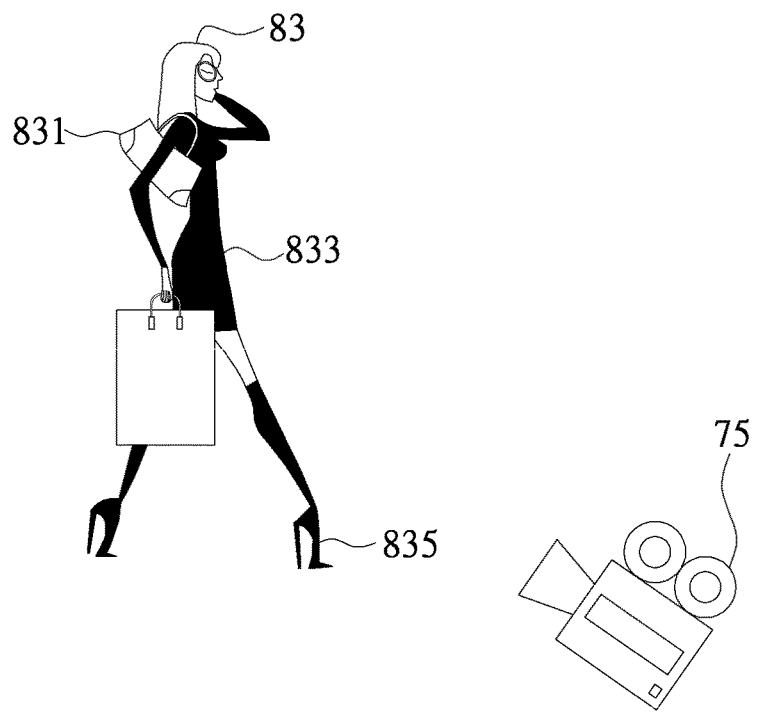
FIG. 11B is a schematic view of the operation situation of the interaction system at the 5520$^{th}$ second in the third embodiment of the present invention.
Figure 11B:
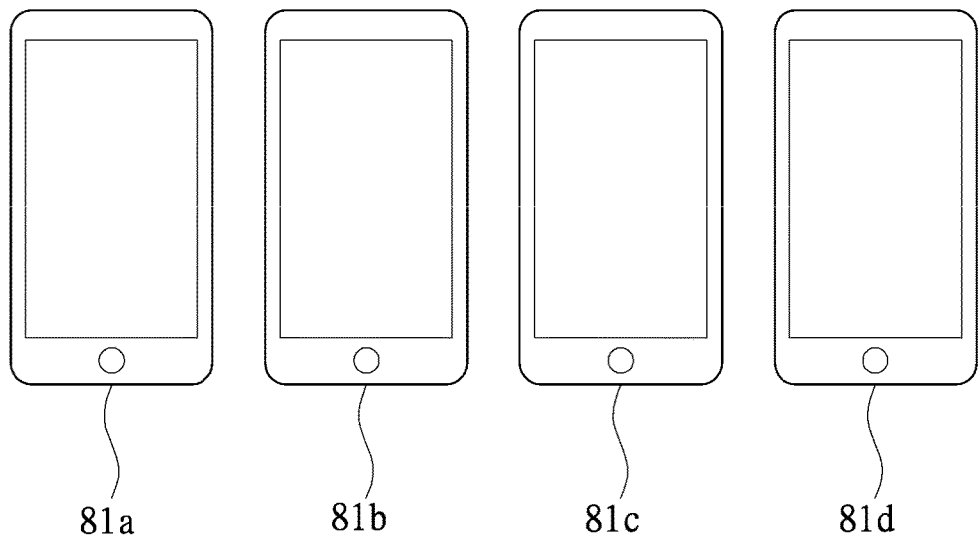

On the other hand, the detector may provide more than one touch region, and a different touch region may indicate an annotated behavior corresponding to a different object category. These touch regions may also include touch regions expressing the repetitions and new objects, respectively. Through these different touch regions, the intelligent module 78 could determine whether the user has ever done an annotated behavior in response to the object when the user does an annotated behavior on the detector, whereby the intelligent module 78 may more accurately determine one or more objects in which the user is interested. For example, please refer to FIGS. 7C, 8A, 8B, 11A and 11B, and FIG. 11B is a schematic view of the operation situation of the interaction system at the 5520th second in the third embodiment of the present invention. FIG. 11A illustrates that a vehicle 85 and a female 83 appear in a performance at the 3000th second, and FIG. 11B illustrates that only the female 83 appears in the performance at the 92nd-minute (i.e. the 5520th second). If the user repeats touching the touch region 555 once after touching the product touch region 553 of the detector 515 in FIG. 7C once at the 3000th second and then touching the product touch region 553 once at the 5520th second, the intelligent module 78 may determine that the product attracting the user at the 3000th second is the handbag 831, the dress 833 or the high-heels 835, which is put on the female 83 and appears at the two time points during the performance, rather than the vehicle 85 according to the user's two annotated behaviors and following repeated annotated behavior. Therefore, the intelligent module 78 may choose the interaction information content 631 of the handbag, the interaction information content 633 of the dress and the interaction information content 635 of the high-heels from the database 60 to output them.

On the contrary, if the user touches the product touch region 553 of the detector 515 in FIG. 7C once at the 3000th second and after touching the product touch region 553 once at the 5520th second, touches the new object touch region 557 once, the intelligent module 78 may determine that the user is interested in the vehicle 85 appearing at the 3000th second, and is also interested in the dress 833, the handbag 831 or the high-heels 835 put on the female 83 appearing at the 5520th second. In brief, the intelligent module 78 may determine whether an object in a category in which the user is interested appears repeatedly, according to the user's two or more than two annotated behaviors and according to the occurrence of a repeated annotated behavior or the occurrence of a new object annotated behavior. Therefore, if the user does a repeated annotated behavior in response to the repeated appearance of an object attracting the user, the intelligent module 78 could accurately determine an object in the category in which the user is interested.

On the other hand, the electronic device may be an embedded device, and for example, the electronic device may be embedded in a sofa or a table. When the user is watching a performance, the user could input an annotated behavior to an electronic device embedded in a sofa or table in response to an interesting object appearing in the performance. The present invention has no limitation on what such an embedded device is embedded in.

On the other hand, the detector may be disposed to an electronic device, and this electronic device does not include a camera for recording the performance. The processing module respectively surveys each of the video frame images and the index tags related to the video frame image in the database according to the annotated time and the annotated behavior, so as to find a certain video frame image matching the annotated time and then output a content of the interaction information corresponding to each index tag of this video frame image matching the annotated behavior to another electronic device. In other words, the detector, which is used to produce the annotated time and the annotated behavior by the user, may be disposed on a first electronic device, and a second electronic device may receive the content of the interaction information. In brief, the present invention has no limitation on the embodiment of an electronic device receiving the content of the interaction information.

Figure 12:
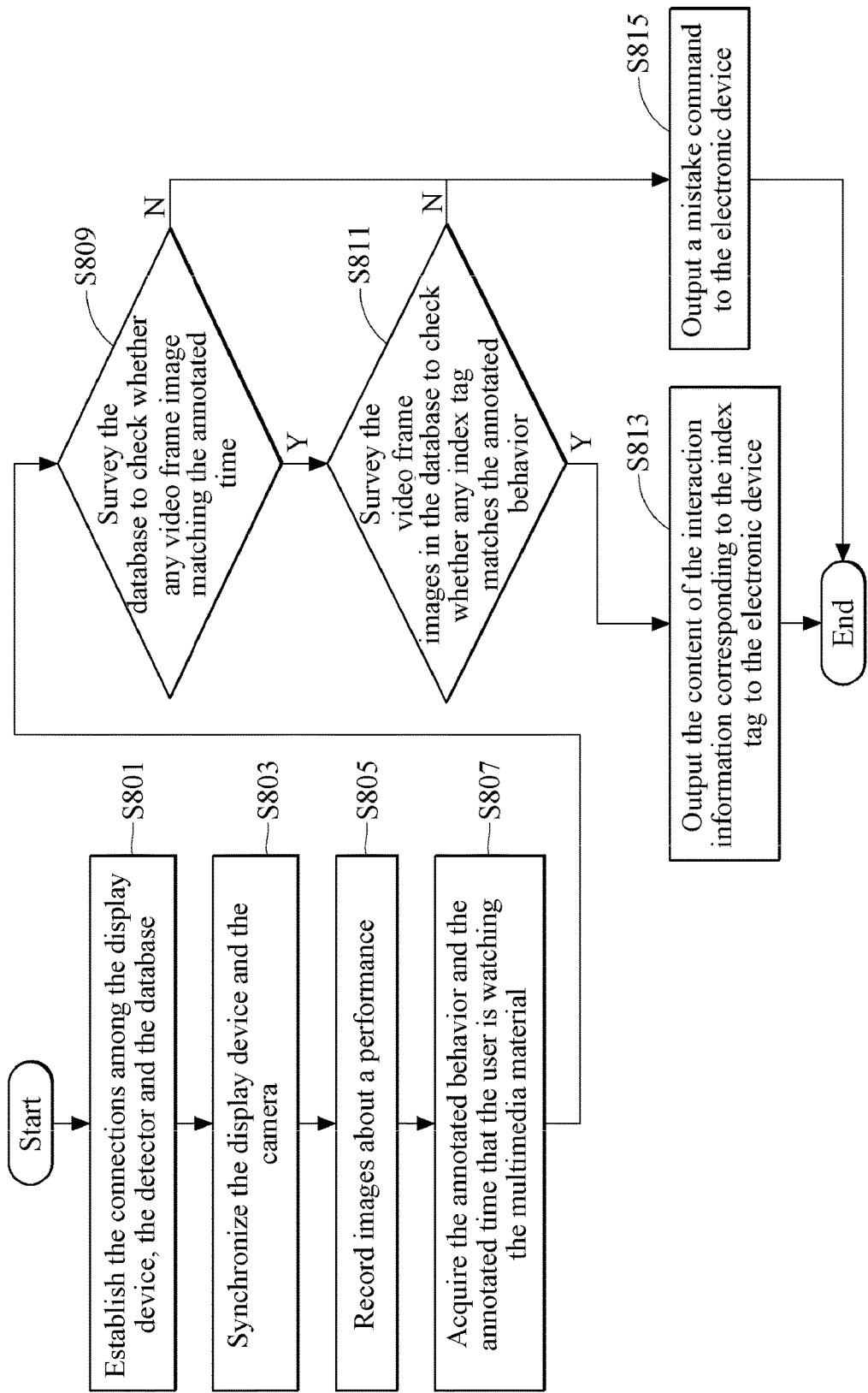
FIG. 12 is a flow chart of a method of providing the interaction information in the third embodiment of the present invention.

In order to illustrate the operation of the interaction system, the present invention further provides the third embodiment of the interaction method. Please refer to FIG. 12, and FIG. 12 is a flow chart of a method of providing the interaction information in the third embodiment of the present invention. The interaction method in this embodiment may be carried out by the interaction system 7 in FIG. 10, so also refer to FIG. 10 for understanding of this embodiment. In addition, the detailed process can be referred to the previous embodiment, and it will not repeatedly be described hereinafter.

Firstly, in step S801, establish the connections among the camera 75, the detector 715 and the database 73, and in step S803, synchronize the camera 75 and the detector 715. Next, in step S805, use the camera 75 to record a performance to obtain a multimedia material when the user is watching the performance. Then, in step S807, use the detector 715 to acquire an annotated behavior and an annotated time that the user is watching the multimedia material. Subsequently, in step S809, use the processing module 77 to survey the timestamps of the video frame images in the database 73 according to the annotated time acquired by the detector 715 to find the video frame image matching the annotated time. Next, in step S811, use the processing module 77 to compare the annotated behavior acquired by the detector 715 with the index tags of each piece of interaction information of the video frame image in the database 73 to determine if any index tag matches the annotated behavior. Finally, in step S813, when one of the index tags matches the annotated behavior, the processing module 77 outputs a content of the interaction information corresponding to the index tag to the electronic device 71.

On the other hand, in step S815, when none of the timestamps of the video frame images matches the annotated time or when none of the index tags matches the annotated behavior, the processing module 77 outputs a mistake command to the electronic device 71. However, such a process is one of the embodiments of the interaction method rather than is used to limit the present invention.

As set forth above, an interaction system and an interaction method thereof in an embodiment of the present invention may timely provide a user, who is watching a multimedia material, with the interaction information about an object, appearing in the displayed content of the multimedia material, according to the user's selection of the object, so as to efficiently satisfy the user's active need. An interaction system and an interaction method thereof in another embodiment of the present invention may employ more than one detector of more than one user watching a multimedia material, to acquire respective annotated behaviors and annotated times in accordance with which the users do their respective actions on their detectors in response to one or more object categories in the one or more displayed contents of the multimedia material; after searching for a video frame image matching the respective annotated time, the present invention may search for a content of the interaction information corresponding to an index tag of the found video frame image, matching the respective annotated behavior; and the present invention may fast and timely provide the users with the interaction information about the one or more objects they want to know, and may efficiently satisfy the users' active needs, and while one user does a specific action on the user's detector in the duration of playing the multimedia material, it may not interfere with another user's watching the multimedia material.

What is claimed is:

1. An interaction system, comprising:
    a display device for playing a multimedia material in at least one display region;
    a detector for acquiring a comment about that a user is watching the multimedia material;
    a database for storing a plurality of interaction information related to the multimedia material, wherein each of the plurality of interaction information corresponds to more than one index tag which comprises time information, corresponding to a timestamp of a video frame image of the multimedia material displayed in the at least one display region, and/or position information, corresponding to at least one position in the at least one display region; and
    a processing module for surveying the index tags in the database according to the comment acquired by the detector, wherein when one of the index tags matches the comment, the processing module outputs a content of the interaction information corresponding to the index tag to at least one electronic device; and
    wherein the detector performs a grid survey algorithm to the multimedia material, so as to calculate,
        (a) an annotated position, said annotated position corresponding to at least one position in the display region playing the multimedia material,
        (b) a grid size used in the grid survey algorithm, wherein said grid size is decided based on a size of an object appearing in the multimedia material.

2. The interaction system according to claim 1, wherein an amount of video frame images in the multimedia material is plural.

3. The interaction system according to claim 2, wherein the comment comprises an annotated behavior done by the user who is watching the multimedia material, an annotated time, which corresponds to the timestamp that the annotated behavior is done in duration of playing the multimedia material, said annotated position, or a combination thereof.

4. The interaction system according to claim 3, wherein the processing module selects one of the video frame images according to the annotated time acquired by the detector, and the processing module determines the index tags in the database according to the annotated behavior and/or the annotated position obtained by the detector.

5. The interaction system according to claim 3, wherein the annotated behavior is carried out on the display device and/or the electronic device.

6. The interaction system according to claim 5, wherein the annotated behavior is carried out on the display device and is to touch an object in a displayed content of the multimedia material played by the display device or to move a cursor to select the object in the displayed content of the multimedia material when the user is watching the multimedia material.

7. The interaction system according to claim 5, wherein the annotated behavior is carried out on the electronic device and is to input sliding path information and/or pressing information on a touch screen of the electronic device and/or to receive audio information by an audio receiver of the electronic device; and the index tag further includes behavior information corresponding to the sliding path information, the pressing information and/or the audio information.

8. An interaction system, comprising:
    a display device for playing a multimedia material in at least one display region;
    a detector for acquiring a comment about that a user is watching the multimedia material;
    a database for storing a plurality of interaction information related to the multimedia material, wherein each of the plurality of interaction information corresponds to more than one index tag which comprises time information, corresponding to a timestamp of a video frame image of the multimedia material displayed in the at least one display region, and/or position information, corresponding to at least one position in the at least one display region; and
    a processing module for surveying the index tags in the database according to the comment acquired by the detector, wherein when one of the index tags matches the comment, the processing module outputs a content of the interaction information corresponding to the index tag to at least one electronic device;
    wherein the processing module outputs a mistake command to the electronic device when the index tags do not match the comment such that the electronic device links to a cloud society web interface through a network.

9. The interaction system according to claim 8, further comprising:
    an intelligent module for adjusting, deleting, and/or increasing a display priority of a content of the interaction information outputted to the electronic device, and/or deleting and/or increasing the interaction information according to a preference analysis result of the user.

10. A method for acquiring and processing interaction information of a user watching a multimedia material comprising:
    controlling a display device to play a multimedia material in at least one display region;
    controlling a detector to acquire a comment about a user watching the multimedia material on the display device;
    storing a plurality of interaction information related to the multimedia material in a database, wherein each of the plurality of interaction information corresponds to more than one index tag which comprises time information, corresponding to a timestamp of a video frame image of the multimedia material displayed in the at least one display region, and/or position information, corresponding to at least one position in the at least one display region;
    surveying the index tags in the database with a processing module according to the comment acquired by the detector, wherein when one of the index tags matches the comment, the processing module outputs a content of the interaction information corresponding to the index tag to at least one electronic device;
    outputting a mistake command to the electronic device by the processing module when none of the index tags matches the comment, so the electronic device links to a cloud society web interface through a network.

11. The method according to claim 10, wherein the interaction system further comprises an intelligent module, and the method further comprises a step of:
    controlling the intelligent module to adjust, delete and/or increase a display priority of a content of the interaction information outputted to the electronic device and/or delete and/or increase the interaction information according to a preference analysis result of the user.

12. The interaction system according to claim 8, wherein the electronic device is a smart phone, tablet computer, personal digital assistant, intelligent wearable device, television screen, or a combination thereof, which comprises an interactable screen.

13. The interaction system according to claim 8, further comprising: a camera for recording a performance to obtain the multimedia material.

14. The method according to claim 10 further comprising, wherein the controlling the display device step further comprises performing at least one networking method to respectively establish connections among the display device, the detector and the database and synchronize the display device and the detector, so the detector synchronously acquires the timestamp and the video frame image of the multimedia material.

15. The method according to claim 10 further comprising recording a performance with a camera to obtain the multimedia material;
performing at least one networking method to respectively establish connections among the camera, the detector and the database, and synchronizing the camera and the detector so the detector synchronously acquires the timestamp and the video frame image of the multimedia material.

16. The method according to claim 10, wherein the annotated behavior is carried out on the display device and/or the electronic device.

17. The method according to claim 16, wherein the annotated behavior is carried out on the display device, and is to touch an object in a displayed content of the multimedia material played by the display device or to move a cursor to select the object in the displayed content of the multimedia material when the user is watching the multimedia material.

18. The method according to claim 16, wherein the annotated behavior is carried out on the electronic device and is to input sliding path information and/or pressing information on a touch screen of the electronic device and/or to receive audio information by an audio receiver of the electronic device; and the index tag further includes behavior information corresponding to the sliding path information, the pressing information and/or the audio information.

* * * * *